US007873830B2

(12) United States Patent
Fayad et al.

(10) Patent No.: US 7,873,830 B2
(45) Date of Patent: Jan. 18, 2011

(54) METHODS FOR COORDINATING ACCESS TO MEMORY FROM AT LEAST TWO CRYPTOGRAPHY SECURE PROCESSING UNITS

(75) Inventors: Camil Fayad, Poughkeepsie, NY (US); John K. Li, Woodstock, NY (US); Siegfried Sutter, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 11/331,918

(22) Filed: Jan. 13, 2006

(65) Prior Publication Data

US 2007/0168676 A1    Jul. 19, 2007

(51) Int. Cl.
*H04L 9/32* (2006.01)
*G06F 9/50* (2006.01)
*G06F 15/167* (2006.01)
*G06F 13/00* (2006.01)

(52) U.S. Cl. .................. 713/169; 713/189; 713/193; 711/150; 711/153; 711/147; 709/213; 709/215; 380/277

(58) Field of Classification Search ................ 726/189, 726/193; 380/277; 711/153, 147, 150; 709/213, 709/215; 713/189, 193, 169
See application file for complete search history.

(56) References Cited

U.S. PATENT DOCUMENTS

| | | | |
|---|---|---|---|
| 5,321,752 A | 6/1994 | Iwamura et al. | |
| 5,513,133 A | 4/1996 | Cressel et al. | |
| 5,764,554 A | 6/1998 | Monier | |
| 5,825,878 A * | 10/1998 | Takahashi et al. | 713/190 |
| 6,108,524 A * | 8/2000 | Hershey et al. | 455/67.11 |
| 6,360,303 B1 * | 3/2002 | Wisler et al. | 711/152 |
| 6,434,699 B1 | 8/2002 | Jones et al. | |
| 6,625,631 B2 | 9/2003 | Ruehle | |
| 6,789,256 B1 * | 9/2004 | Kechriotis et al. | 719/312 |
| 6,804,696 B2 | 10/2004 | Chen et al. | |

(Continued)

OTHER PUBLICATIONS

Suh et al. "AEGIS: A single-chip secure processor" Information Security Technical Report, 2005.*
Shi, Weidong et al. "Architectural Support for High Speed Protection of Memory Integrity and Confidentiality in Multiprocessor Systems", Proceedings of the 13th International Conference on Parallel Architecture and Compilation Techniques (PACT'04), 2004.*
"A Circuit Chip for Cryptographic Processing Having a Secure Interface to an External Memory," U.S. Appl. No. 10/938,835, filed Sep. 10, 2004.
Kornerup, Peter, "A Systolic, Linear-Array Muliplier for a Class of Right-Shift Algorithms," IEEE Transactions on Computers, vol. 43, No. 8, pp. 892-898 (Aug. 1994).

(Continued)

*Primary Examiner*—Michael J Simitoski
(74) *Attorney, Agent, or Firm*—Steven Chiu, Esq.; Kevin P. Radigan, Esq.; Heslin Rothenberg Farley & Mesiti P.C.

(57) ABSTRACT

Electronic circuit chips which include cryptography functions are arranged in multichip configurations through the utilization of a shared external memory. Security of the chips is preserved via a handshaking protocol which permits each chip to access limited portions of the memory as defined in a way that preserves the same high security level as the tamper proof chips themselves. The chips may be operated to work on different tasks or to work on the same task thus providing a mechanism for trading off speed versus redundancy where desired.

19 Claims, 14 Drawing Sheets

U.S. PATENT DOCUMENTS

| | | | |
|---|---|---|---|
| 2003/0133574 A1* | 7/2003 | Caronni et al. | 380/277 |
| 2004/0019771 A1* | 1/2004 | Quach | 712/229 |
| 2006/0107032 A1* | 5/2006 | Paaske et al. | 713/2 |
| 2006/0230439 A1* | 10/2006 | Smith et al. | 726/9 |

OTHER PUBLICATIONS

Montgomery, Peter, "Modular Multiplication Without Trial Division," Mathematics of Computation, vol. 44, No. 170, pp. 519-521 (Apr. 1985).

* cited by examiner

US 7,873,830 B2

METHODS FOR COORDINATING ACCESS TO MEMORY FROM AT LEAST TWO CRYPTOGRAPHY SECURE PROCESSING UNITS

TECHNICAL FIELD

The present invention is directed to a method for coordinating access to external memory from at least two processing units each of which has a secure boundary. More particularly, the present invention is directed to coordinating the activities of separate and distinct cryptographic processing units. Even more particularly, the present invention is directed to a method for linking the activities of two processing chips each of which requires a secure boundary.

BACKGROUND OF THE INVENTION

The present invention is an improvement upon the integrated circuit chips described in application Ser. No. 10/938,835 filed on Sep. 10, 2004. In this application is part of a collection related applications all filed with the same specification, but with a different set of claims, there is described a circuit which provides "Cryptography On A CHip" (COACH). These COACH chips include a microprocessor element, a cryptography engine, and an external interface together with battery backed up memory. At least part of the memory for a COACH device is provided in a battery backed up fashion with guaranteed volatility. Additionally, each COACH device is provided with a unique set of hard wired cryptographic keys used as a private key in a cryptography system. Additionally, the cryptography engine, interface, microprocessor, and memory are coordinated through a switch control having an application specific integrated circuit (ASIC) portion together with a field programmable gate array (FPGA) portion. The operation of the COACH devices are described in the above-referenced patent application. In particular, there is described therein (and herein as well) a mechanism for initializing each COACH device. This initialization is provided in a secure manner via the secret, private cryptography keys contained on each COACH device. Typically, these private keys are provided by fused devices. In a fused device mechanism, the cryptographic private key may be established subsequent to the manufacture and packaging of the chip. However, it is noted that the private key may be hardwired into the COACH device during its manufacture as well.

In the COACH system, there is provided a mechanism for securely programming the FPGA portion of the central control switch which coordinates the activities of the various other component areas mapped on to the chip including a cryptographic engine and a separate microprocessor having its own dedicated on chip memory. In addition, there is also a separate memory in which is secure and volatile. COACH devices are preferably provided with standard security features including meshes and intrusion detection which causes erasure of the volatile memory.

One of the features provided in the above-referenced patent application is a system and method for the use of an external memory. Normally, the use of an external memory in conjunction with a secure mechanism, such as a COACH device, would be impossible without compromising its security features. However, as described in the above-referenced patent application, and herein as well, there is provided a cryptographically secure mechanism by which the COACH device is still nonetheless able to utilize an externally deployed memory. In particular, the above-referenced patent application describes an external memory interface which permits the storing and retrieval of both encrypted and clear data in an external memory in a secure fashion. One of the mechanisms for providing this security is through the controlled access of various regions of the external memory which can be securely defined as being either for encrypted data or for unencrypted data. This capability greatly extends the utility of COACH devices.

However, and most relevantly for the present invention, two COACH devices are, without the present invention, incapable of sharing access to a common external memory. In particular, without the present invention, COACH devices cannot operate in a coordinated fashion. However, with the introduction of the capability of controlled access to a common memory, it is now possible now to COACH devices work in a coordinated fashion. This coordinated effort may for example be the carrying out of parallel operations on the same set of data in a redundant fashion so as to provide a mechanism which is more highly reliable. Should the results of such operations carried out on two separate coordinated COACH devices not be the same, an error indication would be generated.

In other scenarios, COACH devices are now rendered capable of operation in a coordinated fashion in which each COACH device operates on a different portion the same task so as to complete the task more quickly. Accordingly, it is seen that the ability to securely control access to an external memory shared between COACH devices provides a mechanism for user selectable parameters of either speed or redundancy. Additionally, with the use of the coordinating techniques of the present invention, it is also seen that the aspects of COACH device coordination are not in fact limited to merely two COACH devices, but rather can be extended to any practical number of such mechanisms.

SUMMARY OF THE INVENTION

In accordance with a preferred embodiment of the present invention, a method is provided for coupling two secure processing units comprising the step of coordinating access to memory external to these units to the secure exchange of the cryptographic key information through each chip secure boundary. More particularly, the coordinating activity of the present invention comprises cryptographic key exchange through public key encryption with the use of private keys associated with each chip. The following key exchange operations data is stored in encrypted fashion under the shared keys in defined areas of an external memory. An exchange of keys addresses and the designation of what each address contains is also something by an exchange in which the secure chips exchange key information with respect to shared data. In this fashion, an external memory is shared and used to coordinate operations between one or more secure chip devices.

In the present invention the process referred to above is also preferably facilitated by a set up process for each COACH device, as described in the above-referenced patent application. In particular, the set up operation deploys verifiable signatures within battery backed up volatile memory portions internal to each secure device. These verified signatures are usable as a mechanism to indicate that each of the secure devices which are to be coupled together in a coordinated fashion are in fact "owned" or authorized by the same trusted party. Furthermore, it is noted that, in the present invention, one of the secure devices referred to herein as chip zero operates as a master device with the other secure chip devices operating in a slave mode. In short, coordinating control activities are handled by a specific one of the secure chips.

Accordingly, it is an object of the present invention to provide a mechanism for coordinating the activities of two otherwise independently operative secure processing units.

It is also an object of the present invention to provide a method for sharing external memory by two processing units each of which possesses a secure boundary.

It is yet another object of the present invention to provide a mechanism under which activities of independent, secure processing units are coordinated to either increase the processing powers of the two units or by providing redundant operations for greater reliability.

It is also an object of the present invention to provide a mechanism for user-controlled selection of improved reliability or greater processing power in a collection of one or more secure independent processing unit.

It is also an object of the present invention to provide a method for enhancing secure processing operations.

Lastly, but not limited hereto, it is an object of the present invention to provide a method step in which two independent, secure processing units are enabled to establish initial conditions for subsequent secure operations.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

BEST MODE FOR CARRYING OUT THE INVENTION

The present invention is made possible through the utilization of three distinct technologies which, working together, provide a mechanism for the construction of a single chip device which is both extremely secure, flexible and immune from attack. In particular, the use of voltage islands on a chip has lead to the ability to employ a dual power supply for an internal volatile low power dissipation storage. The dual power supply includes a regular power supply and a battery backup. Additionally, the utilization of field programmable gate arrays (FPGAs) has led to a security system on a single chip which can be programmed in a secure manner from the outside without any degradation in the level of security provided. Thus, the present invention is able to incorporate new algorithms as they are developed as well as being able to concatenate old (or new) algorithms in new ways to achieve even higher levels of security. Lastly, in terms of the technologies that have been exploited in the design of the present invention, the increase in circuit packing density is also a significant factor.

Figure 1:
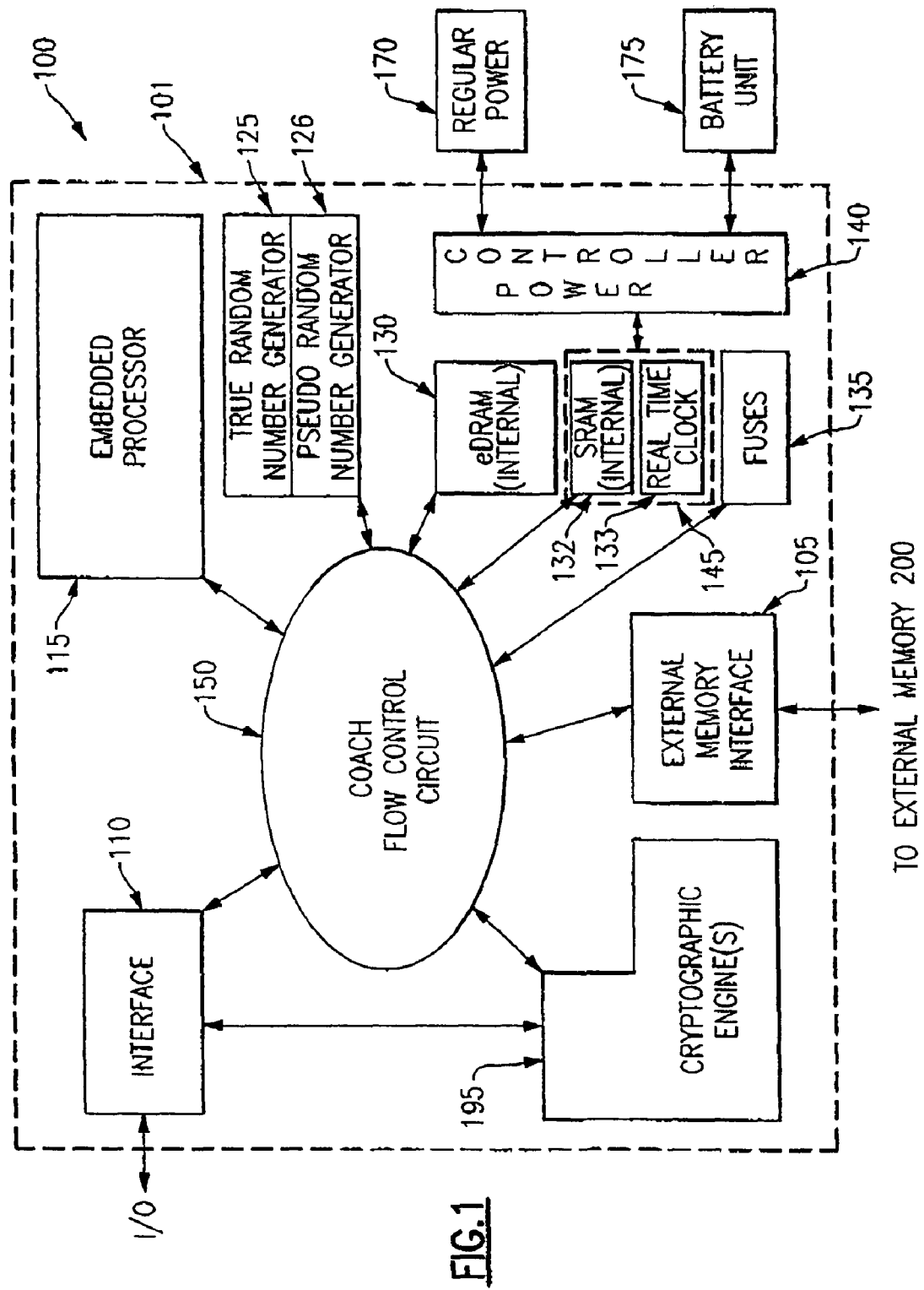
FIG. 1 is a block diagram illustrating the architecture of a single circuit chip which is intended to provide a plurality of cryptographic (and related) functions within a secure boundary and in particular, illustrating the use of combined ASIC and FPGA circuits to control the flow of information within the chip.

The overall architecture of the present invention is illustrated in FIG. 1. The invention described most thoroughly herein is directed to a secure single chip for carrying out cryptographic functions. However, as mentioned above, the mechanisms and procedures set forth herein are also more widely applicable to any situation in which one wishes to employ FPGA circuits in a fashion in which they can only be programmed in a secure manner by trusted entities having possession of appropriate cryptographic keys. Furthermore, as seen in FIG. 1, chip 100 includes embedded (micro)processor 115. This enables the generic construction of microprocessor chips where the processor is controlled in a secure manner by an FPGA which is itself programmable in an entirely secure manner (which is more particularly described below in reference to the discussions surrounding FIGS. 4 through 11). This means that any embedded processor can be controlled in a secure fashion. For example, it can be controlled so as to limit the execution of certain instructions to trusted users who can provide authenticatable keys.

In preferred embodiments of the present invention, security is also provided within secure boundary 101 which is tamper evident, resistant and responding and which meets the above described Level 4 FIPS standards. In this regard, it is noted that tamper proof enclosures do not require that a mesh be present; tamper proof enclosures can be constructed without meshes. As defined in the FIPS 140-2 standard. Further details are provided below.

Figure 2:
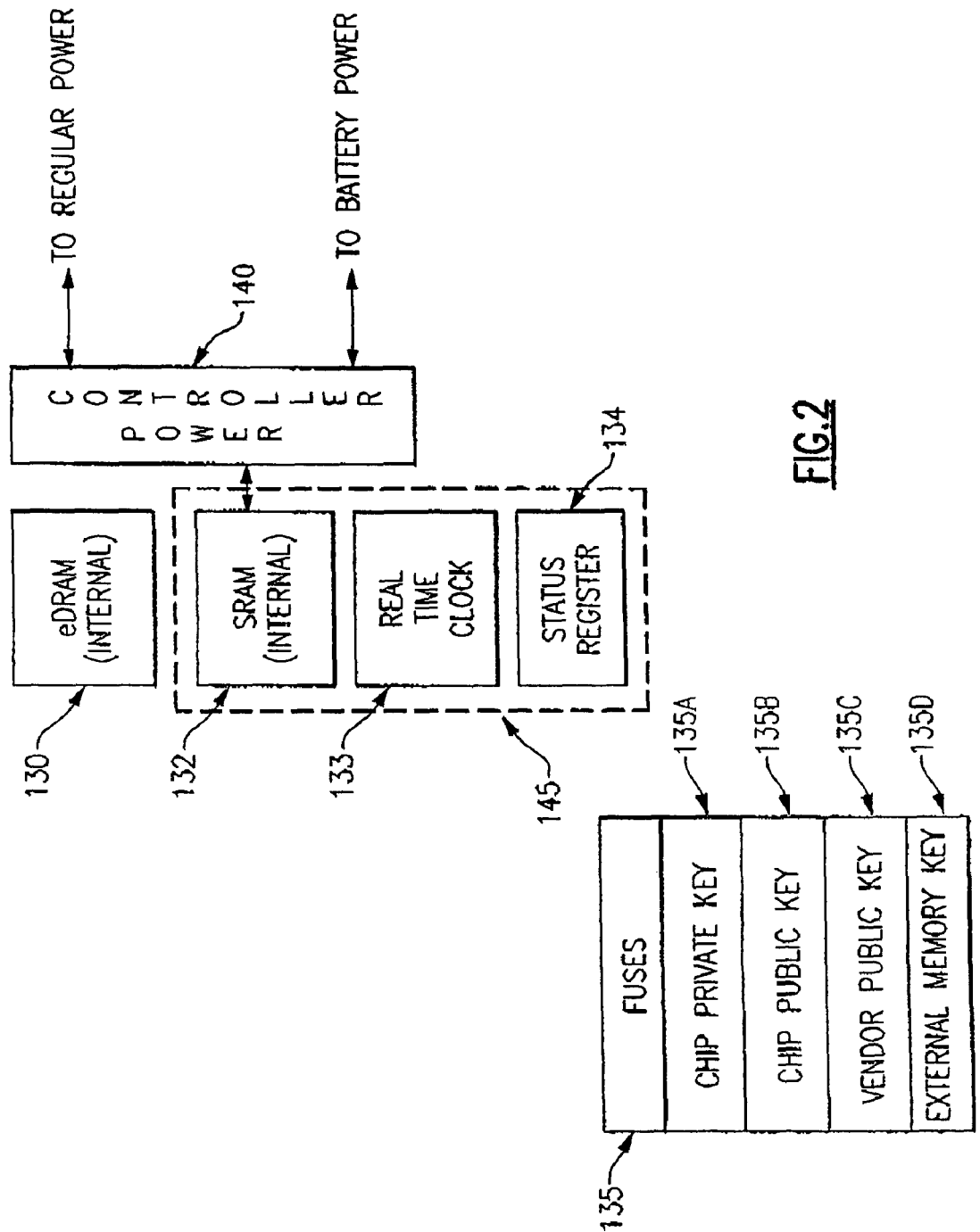
FIG. 2 is a block diagram more particularly illustrating the portion of FIG. 1 that relates to the presence of fusible elements that permanently store certain specified cryptographic keys.

The more specific, single-chip, secure cryptographic processor of the present invention comprises several principal portions: external interface 110, processor 115, cryptographic engine (or engines) 195, random number generators (125 and 126), external memory interface 105 and memory components disposed within powered voltage island 145. A more detailed view of the circuits found on voltage island 145 is shown in FIG. 2. The rest of the chip is powered separately and exists on its own voltage island. However, switching between regular power and battery power is carried out within the chip itself using a voltage regulator with the default power source being regular power and with the alternate source as a backup being a battery. There is no pin saving to be had by moving this function off of the chip. The only saving would be in the consumption of less chip circuit area but that advantage would not help to solve the latency problem for external devices. All of these components are provided on a single chip. In addition, there is provided flow control switch 150 which receives external requests through interface 110 in the form of request blocks. While component 150 is described as a switch it also includes a request block processor which receives requests blocks and, in response thereto, directs and controls the flow of information between and among the various other chip components. Most importantly for the present invention switch 150 preferably comprises two distinct components ASIC portion (Application Specific Integrated Circuit) 150A and FPGA portion 150B (see FIG. 11). ASIC portion 150A is also characterizable as a "hard wired" circuit. ASIC portion 150A is used to initialize the system, to initially process request blocks, to interface with the FPGA portion and to insure that only secure FPGA information is used to configure FPGA portion 150B of switch 150. It is the presence of securely configurable FPGA portion 150B that gives rise to a chip that has both highly secure and highly flexible characteristics whether the chip is used to provide access to cryptographic engines or for other purposes related to secure processor control. It is also noted that FPGA portion 150B makes it possible for a chip vendor to provide a completely customized processor unit (see below for a description of the distinction between a chip vendor and a chip manufacturer and their relative roles and see especially FIG. 4). With specific reference to FIG. 11 it is noted that connections from flow control circuit 150 to other components on the chip are not limited to connections that are only made to ASIC side 150A. For example, FIG. 11 should not be interpreted as indicating that there are no connections between FPGA portion 150A and cryptographic engines 195. However, it is noted that even if the chip is intended for processor control and not intended to be limited to cryptographic operations, some form of internal cryptographic engine is required to provide the encryption and decryption that makes the processing secure.

The System On a Chip (SOC or COACH) of the present invention uses voltage islands in the following way. A line for applying a voltage has two power sources for preserving data in internal, deliberately volatile SRAM memory 132. When the printed circuit card on which the COACH system is deployed is powered as normal, this normal power is used to maintain SRAM (static random access memory) 132. When the printed circuit card is powered down battery unit 175 is used to maintain data within SRAM memory 132. When neither regular power source 170 nor battery back up 175 are supplying power to power controller 140, no power is supplied to SRAM 132 and its contents vanish. This is important since there is information contained in SRAM 132 that is used to provide security. Its volatile nature insures that disconnection of the chip from a power source always results in the information stored in SRAM 132 being cleared so that it is completely inaccessible. In preferred embodiments, battery backed up SRAM 132 is employed as shown in FIG. 1. While SRAM 132 is primarily employed for the storage of critical parameters, eDRAM 130 is employed as the basic RAM for processor 115. While SRAM 132 is disposed within voltage island 145, eDRAM 130 need not be. Real Time Clock 133 is also disposed within voltage island 145. Real Time Clock 133 is not an essential element for all purposes but is useful for those circumstances in which chip features are enabled on a time limited basis. Real Time Clock 133 is also very desirably present for operating system purposes. It is furthermore necessary for operations in which security is the primary chip function, in which case it is securely initialized. Otherwise Real Time Clock 133 is loaded from the clock of the system in which the chip is incorporated. Additionally, while eDRAM 130 is also not necessarily volatile, it may be. However, access to it is granted or denied through flow control circuit 150. It is anticipated that, in normal operation, eDRAM 130 holds an operating system for the operation of processor 115. This is not, however, a requirement for the broader aspects of the present invention.

Processor 115 preferably comprises a processor having a "footprint" such as that provided by the IBM PowerPC which is manufactured and marketed by the assignee of the present invention. Processor 115 is an embedded processor and may or may not include internal error detection mechanisms such are typically provided by parity bits on a collection of internal or external signal lines. Processors that do provide some form of internal error detection are preferred since they tend to be more reliable. However, even if the processor of the present invention were to fail or to become defective, security measures are not compromised. Accordingly, because of the presence of encrypted safeguards, less complex and less expensive embedded processors 115 may be employed, if desired.

The present invention also preferably includes intrusion detection logic that is local to the interior of the single chip system. This is especially advantageous in that there are no external analog circuits required. Because of the integration of key components within a secure boundary, the single chip processor of the present invention comprises components which are much more difficult to attack, especially in a component selective manner. All access is through defined and limited interfaces: a first interface 110 which accepts commands and data (via request blocks) and a second interface 105 which exchanges data in a controlled fashion with external memory 200 which includes encrypted portion 210 and unencrypted portion 220 (see FIGS. 12, 13 and 14). The specific external memory portion that is accessed is determined entirely by address information generated from within secure boundary 101 of single chip cryptographic processor element 100. Access to external memory 200 is via this interface which is controlled by flow control switch 150. In preferred embodiments of the present invention control of access to external memory is provided through FPGA portion 150B of switch 150.

Interface 110 is the primary port for the communication of data into chip 100. Any well defined interface may be employed. However, a preferred interface is the extended PCI interface used widely within personal computers. Generally, the information that enters this port is encrypted. It is the primary port for the entry of request blocks into the chip. Typically, every portion of an entering request block, except for the command itself, comprises encrypted information. Part of the encrypted information contains a key and possibly a certificate or other indicia of authorization.

Chip 100 also includes one or more cryptography engines 195 which perform encryption and decryption operations using keys supplied to it through flow control switch 150. The cryptographic engine or engines 195 are essentially coprocessors employed by flow control switch 150 and embedded processor 115, not only to provide cryptographic services during normal operation, but just as importantly, engine(s) 195 provide a secure mechanism for structuring FPGA portion 150B of flow control switch 150. These engines also assure that appropriate keys and certificates are present when needed in SRAM 132.

These engines provide specific hardware implementations of various algorithms used in cryptography. Accordingly, the cryptographic chips of the present invention have the ability to select the hardware circuit which is most efficient for the algorithm used to encode the information. A particularly preferable cryptography engine is described in U.S. patent application Ser. No. 09/740,485 filed Dec. 19, 2000. This engine provides efficiencies created by and through the recognition of the possibility of pipelining certain operations involved in multiplication modulo a large prime number. As indicated above, the present invention is also capable of employing a plurality of cryptographic engines all of which can be the same or different. In this regard it is noted that the request block (see the discussion below regarding FIG. 11) includes a field which identifies the cryptographic engine or set of cryptographic engines to be employed. However, the present invention is not limited to the use of any particular engine for encryption and decryption. Furthermore, while these engines are often based on algorithms that perform modular exponentiation operations, the present invention embraces the use of any engine, implementing any sufficiently desirably secure cryptographic algorithm or method. In particular, the present invention is not limited to the use of cryptographic engines that are based upon the public key/private key paradigm. However, some on-chip capability in the use of this paradigm is used to provide security for programmable logic devices, configuration data and for software. Moreover, it is pointed out that one of the particularly advantageous aspects of the present invention is that, with the flexibility provided by FPGA portion 150B and with the coding present in memory portions accessible to embedded processor 115, it is possible to provide cryptography services based on a plurality of serially intermixed algorithms for encryption and decryption. In short, the present invention allows the construction of an indefinite number of cryptographic schemes which are built up and used, all within the convenience of a single chip implementation. The only limitation being the increase in processing time to carry out encryption and decryption operations. However, this time usage grows only linearly.

Chip 100 is also provided with access to external memory 200. This memory is preferably a RAM device but is not so limited. Any addressable memory device may be employed. Access to external memory 200 is provided through external memory interface 105. The primary function of this interface is to enforce addressability constraints built into the present chip/system under which an external memory includes two portions: (1) a clear portion which is intended to hold only unencrypted information (but could hold encrypted information) and (2) an encrypted portion which contains only encrypted information. The partition of external memory 200 into these two portions is controlled by addressability checks performed internally to chip 100 by embedded processor 115 and either ASICs portion 150A of flow control switch 150 or by FPGA portion 150B or by some combination thereof. Furthermore, the flexible nature of FPGA 150 allows the addressability partition boundary between the two portions of external memory 200 to be set by the chip vendor (who may or may not be the same as the chip manufacturer).

Chip 100 also includes internal mechanisms for generating random numbers. For completeness two mechanisms are preferably employed: true random number generator (TRNG) 125 and pseudorandom number generator (PRNG) 126. These generators are typically used to provide seed values for the generation of random numbers used in cryptographic processes. PRNG 126 is typically implemented as a linear feedback shift register which effectively implements multiplication by so-called primitive binary polynomials having no factors. These are well known in the art. See for example U.S. Pat. No. 4,959,832 issued to Paul H. Bardell and assigned to the same assignee as the present invention. TRNG is preferably implemented through the exploitation of on-chip quantum phenomena. True random numbers are typically generated by sampling and processing a source of entropy outside of the user's environment. In the case of high security environments, the random numbers are generated inside the secured boundary. The usual method is by amplifying thermal noise generated by a resistor (Johnson Noise) or by using a semiconductor diode and feeding the bit or bits into a comparator or Schmitt trigger followed by a skew correction on the bit stream to insure an approximately even distribution of ones and zeroes.

Next is considered the circuits that are present within voltage island 145. Electrical power supplied to any and all components within voltage island 145 comes through power controller 140. Power controller 140 provides electrical power-to SRAM 132. If it is anticipated that, in use or in transit, chip 100 were to be powered by a reliable source of power (mains or a relatively large battery), it would also be possible to include eDRAM 130 within voltage island 145 as well. However, since eDRAM 130 typically consumes more power than SRAM 132, it is preferred that eDRAM 130 be located outside of voltage island 145 so that it can be powered by the usual chip bus power supply lines. However, when battery backup becomes a critical power supply source, eDRAM 130 should not be present within voltage island 145 where it would be powered through power controller 140. Even power controller 140 may be disposed outside of voltage island 145. Since preferred embodiments of the present invention employ hard wired (or equivalent) fuses, it is also preferred that fuses 135 containing keys 135A, 135b and 135C (see FIG. 2) are also disposed outside of voltage island 145. However, since hard wired fuse structures do not consume any significant levels of power, they may, if desired or convenient, also be disposed within voltage island 145. Nonetheless, FIG. 1 shows them disposed in their preferred location. It is noted that the so-called hard wired fuses referred to herein may be provided in several ways. For example, a controlled laser may be used to remove conductive materials to create a circuit structure which indicates either a zero bit or one bit entry in a key. The fuses may also be provided by circuit components which are susceptible to producing open circuit conditions upon the application of electrical power above a predetermined level (the usual meaning and origin of the word "fuse" in this context). Other permanent memory structures could also be employed but are less preferred because of their cost and/or size limitations. Power controller 140 receives power from two and only two external sources: regular power supply 170 and battery unit 175. The major function of power controller 140 is to insure that, should regular power supply 170 fail, power is still maintained from battery unit 175 and also to insure that if battery unit 175 and regular power supply 170 both fail, that no power is supplied to SRAM 132 which is volatile. It is the volatility of this memory unit together with the operation of power controller 140 that insures that certain attempts at chip tampering do not result in compromising the integrity of the encrypted information within tamper proof chip boundary 101.

The circuits contained within Coach device 100 also include fuses 135. These fuses are shown in more detail in FIG. 2. Fuses 135 are significant for providing desirable levels of security and functionality to the design, use and operation of the systems of the present invention. In particular, fuses 135 preferably comprise an array of physically altered areas provided during chip manufacture. While described herein as "fuses," primarily for historical reasons growing out of how some of these areas may have been created on other chips for other purposes, the fuses employed herein represent an array of bit positions that are permanently written onto the chip during its manufacture to store certain cryptographic key information. These keys are typically written onto the chip using a laser beam for writing the desired bit patterns for three significant key values: chip private key 135A, chip public key 135B and vendor public key 135C. See FIG. 2. These key values lie within protected tamper proof boundary 101 and also preferably lie within voltage island 145; however, it is noted that it is not essential that keys 135A, 135B and 135C be present within voltage island 145. In point of fact, fuses may be implemented as well in either EPROM or EEPROM technology.

Figure 3:
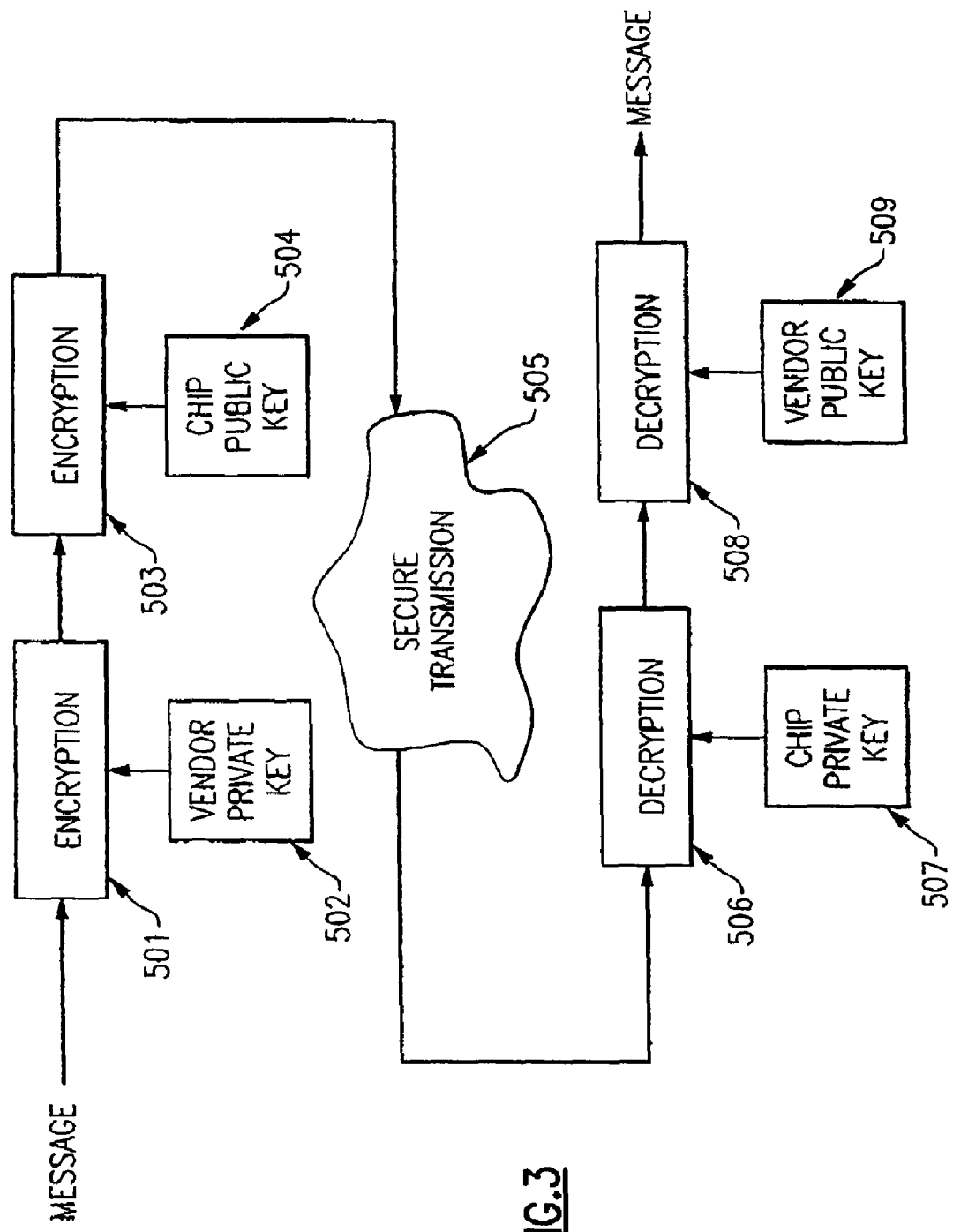
FIG. 3 is a process flow diagram illustrating the use of public and private cryptographic keys managed by two distinct entities, such as a chip manufacturer and a chip vendor, the chip vendor generally being the entity responsible for programming the chips FPGA components.

The keys stored in internally only accessible fuses are used like the key system employed in banks for access to a safety deposit box (except that here there is no opportunity for such things as drilling out the lock by the bank or for the use of a bank master key). In the typical safety deposit box scenario two keys are needed to open a depositor's safety deposit box: the depositor/client brings one key to the bank and a bank employee brings the other/bank key. Both of the keys need to be inserted to open the safety deposit box. The vendor public and private keys are analogous to the client's safety deposit box key; the chip public and private keys are analogous to the bank's safety deposit box key. These keys work together in a process such as that illustrated in FIG. 3. A message (any message, which is really any succession of bits with meaning attributable and known to its author and which includes executable binary programs) is first encrypted (step 501) using the vendor's private key 502. Note that this is the only one of the three keys employed which is not present as a fused area available as information bits to the circuits within chip 100. (Here the terms "public key" and "private key" are used in the cryptographic sense, and not with any sense that should be attributed to the safety deposit box analogy.) The encrypted message from step 501 is then encrypted again (step 503) using chip public key 504. This doubly encrypted message is thus rendered safe for transmission via any convenient path 505. This could include transmission via the Internet, via an intranet or other form of private network or by physically carrying or mailing a floppy disk or any other machine readable medium to a desired destination. Ultimately, however, the destination for this doubly encrypted information is chip 100 itself. This encryption method is very important to understanding both the structure and operation of the present invention and is also very important for providing an understanding of how its security aspects function.

It is important to note that chip private key 507 is present within the secure boundaries of chip 100 through the presence and use of fuse 135A; likewise vendor public key 509 is present within the secure boundaries of chip 100 through the presence and use of fuse 135C. Thus, totally within tamper proof boundary 101, there is present a mechanism for recovering the original message supplied as input to encryption step 501. The doubly encrypted message, arriving from whatever transmission path 505 is desired, is first of all decrypted (step 506) using chip private key 507. However, the information provided as an output from this step is not yet in a useful form. It is again decrypted (step 508) using vendor public key 509. Since vendor public key 509 and chip private key 507 are both available to on-chip circuitry, fully encrypted information may be passed through I/O interface 110 without fear for its security. Information transfer into the chip can thus be provided in a totally secure manner.

The above process is complete in those circumstances in which either a completely ASIC (that is, hardwired) implementation of flow control circuit 150 is provided or in those circumstances in which an already programmed FPGA is present. Accordingly, attention is now focused on this latter scenario, namely, how to assure proper and secure FPGA programming. In order to more fully understand this process, as set forth more particularly in FIG. 11, it is first important to understand the roles of chip vendor and chip manufacturer and to appreciate the process that is undertaken to (1) assure secure FPGA programming and (2) to assure secure loading of software, such as an operating system (or operating system kernel) into eDRAM 130. In general, the roles of chip manufacturer and chip vendor are considered herein, in the broadest scope of the present invention, to be distinct. However, it should be fully appreciated that the present invention also contemplates the scenario in which the manufacturer of chip 100 is also the vendor of the chip.

Figure 4:
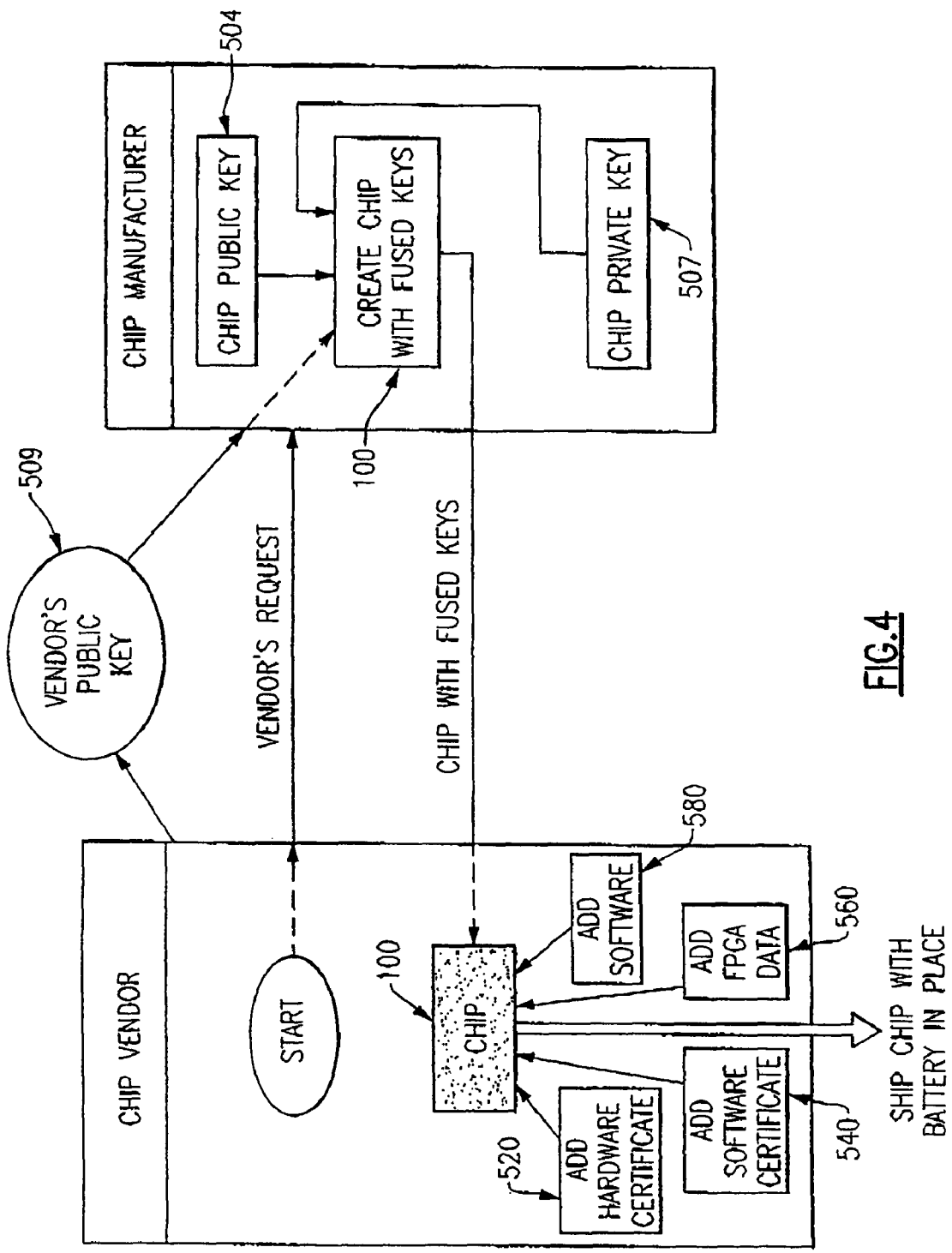
FIG. 4 is a block diagram illustrating the interaction of two entities involved in cryptographic (or other) chip production and marketing.

The process of getting to a fully programmed chip, having an internally secure FPGA component, which is "ready to function" is a multistep procedure and is conveniently separated into two distinct portions. A first portion of the process of producing a "ready to run" chip involves programming the FPGA component. A second part of the process involves loading secure programming within eDRAM 130. Furthermore, each of these processes is itself a multistep process which involves a certification subprocess. An overview of this process is illustrated in FIG. 4. FIGS. 5-10 illustrate the details involved in the subprocesses that are indicated in FIG. 4.

Apart from the posting of the vendor's public key 509, the process typically begins with a request by the chip vendor for one or more chips which are to be manufactured. In the typical scenario, all of the chips from a requesting vendor are manufactured with fuse 135C being encoded to represent the vendor's public key. The fuses themselves may be implemented in several different ways. They may be hardwired in the chip manufacturing process. They may be burned in after chip manufacture by laser or through the use of sufficiently high current pulses, much in the way that ordinary household fuses are "blown." Additionally they may also be provided by ROM, EEPROM or EPROM technology. EPROM fuses have the additional feature that their contents can be erased after usage is complete. The vendor is not limited, however, to the use of a single public key. This key is added to the chip during manufacture in a fashion which renders it possible to be "read" by the rest of the on-chip circuits, say by laser etching of circuit components. The chip manufacturer then adds his own set of two keys: chip private key 507 and chip public key 504 embodied as fuses 135A and 135B. Vendor private key 502 remains a secret to the vendor. Chip manufacturer private key 507 remains a secret to the chip manufacturer. The information as to which chip private key is on which chip is destroyed by the chip manufacturer as soon as the chip is completed. See FIG. 4.

The chip with the desired cryptography keys written onto it and lying within tamper proof barrier 101 is then shipped to one who desires to ship ready-to-function chips. The ready-to-function chips are preferably shipped out mounted on a desired board and connected with battery unit 175 in place to preserve SRAM programming until the card and chip are permanently disposed within a destination system, such as a data processor, server or network environment through which regular power 170 is provided.

Before any substantive information is delivered to the interior of chip 100, two processes are carried out to insure the presence in SRAM 132 of: (1) a vendor's certificate for loading FPGA configuration data and (2) a separate certificate for loading other secure programming data. There are thus two certificates loaded: a vendor's hardware certificate for the subsequent loading of FPGA configuration data and a vendor's software certificate for the subsequent loading of software such as an operating system. Clearly, the FPGA configuration must take place first prior to the loading of other information. In this respect it is important to note that so far only data has been generated for later loading at a customer site. Accordingly, batteries for data retention are not required at this point.

Figure 6:
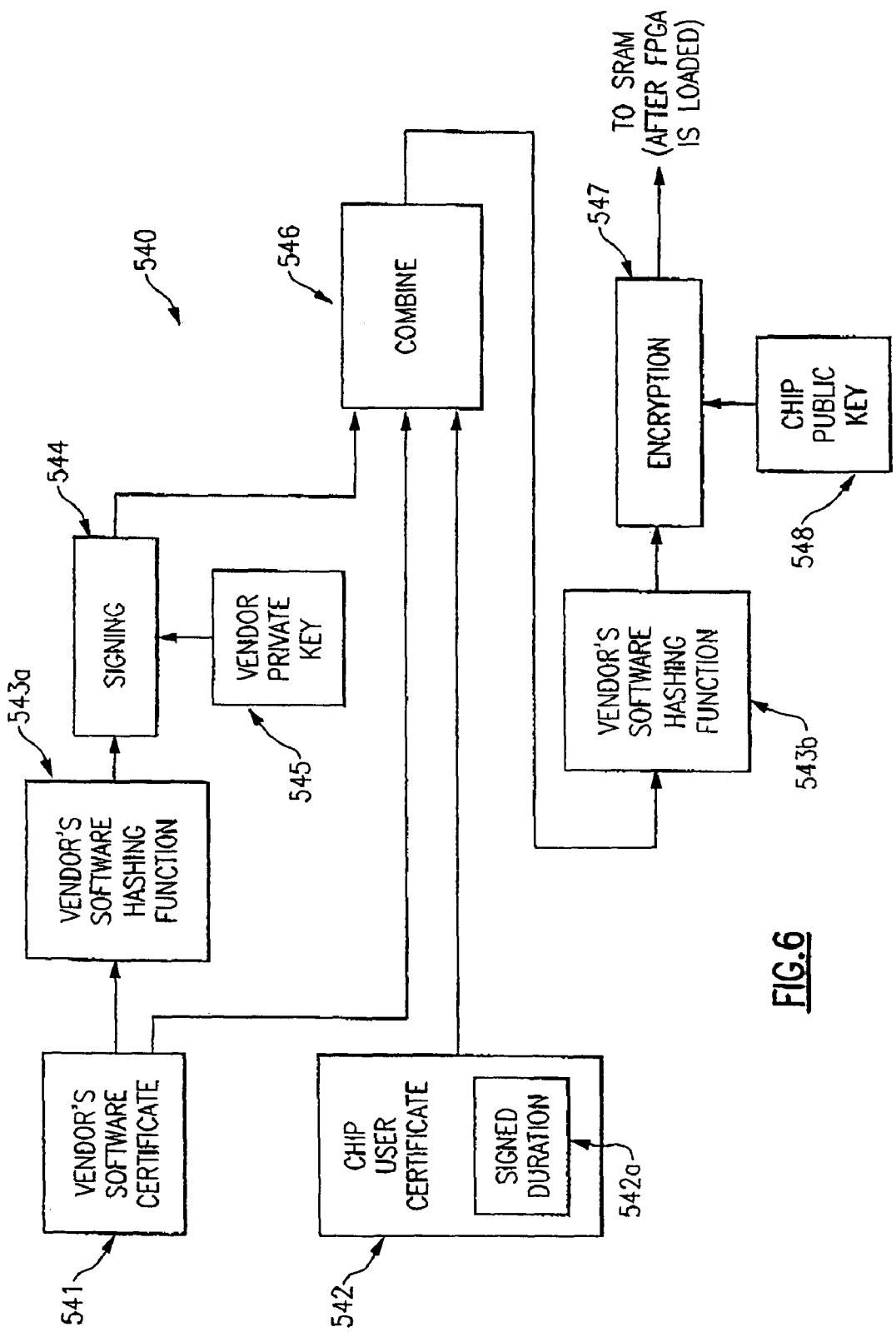
FIG. 6 is a process flow diagram illustrating a process for a vendor to use in order to provide a vendor's software certificate within an internal volatile chip memory to be used for verification and authentication purposes for establishing software operations within the secure boundaries of the chip.
Figure 7:
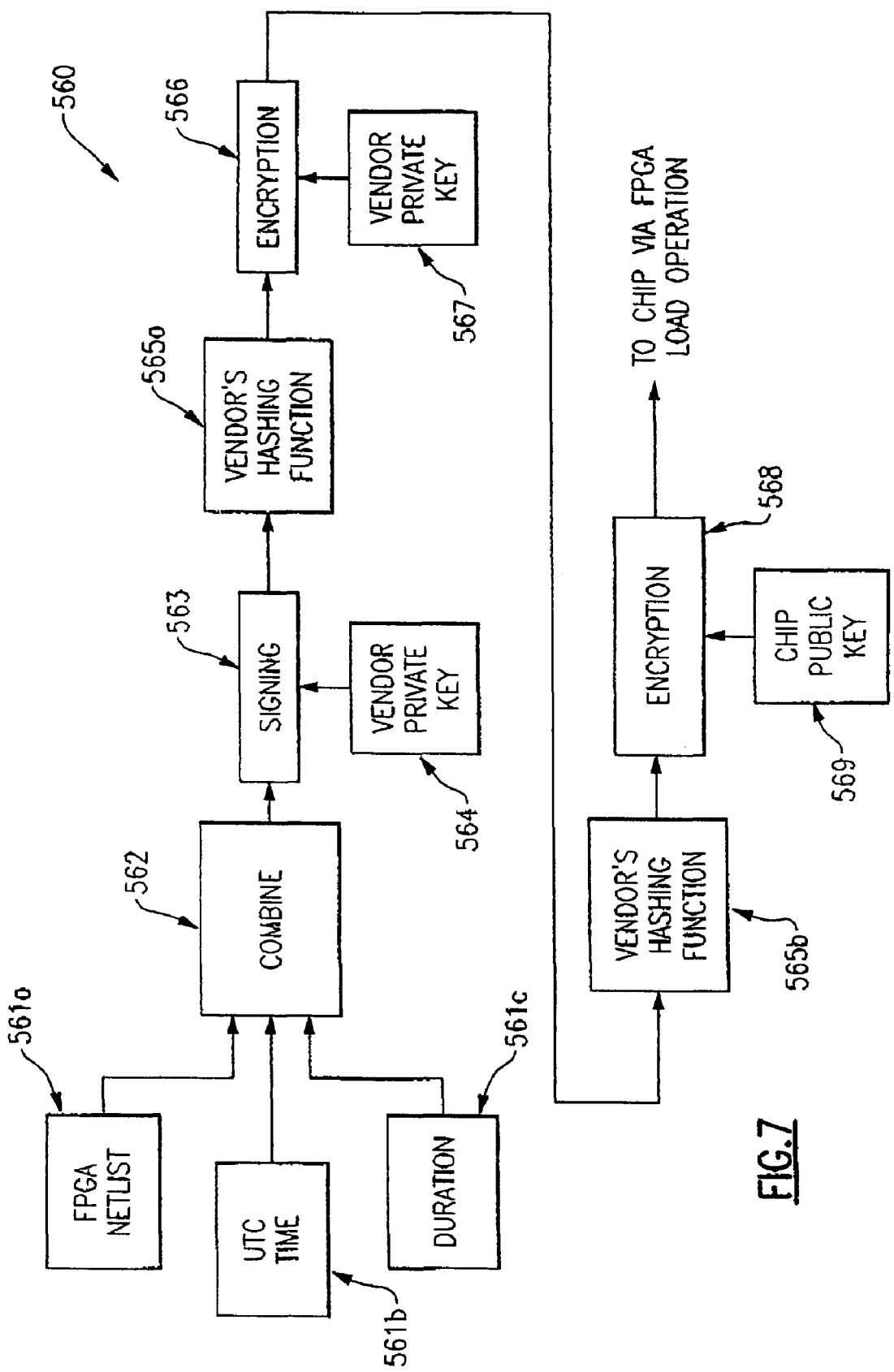
FIG. 7 is a process flow diagram illustrating a preliminary process for a vendor to use in setting up FPGA structural data which is used to configure the FPGA portion of the chip.
Figure 8:
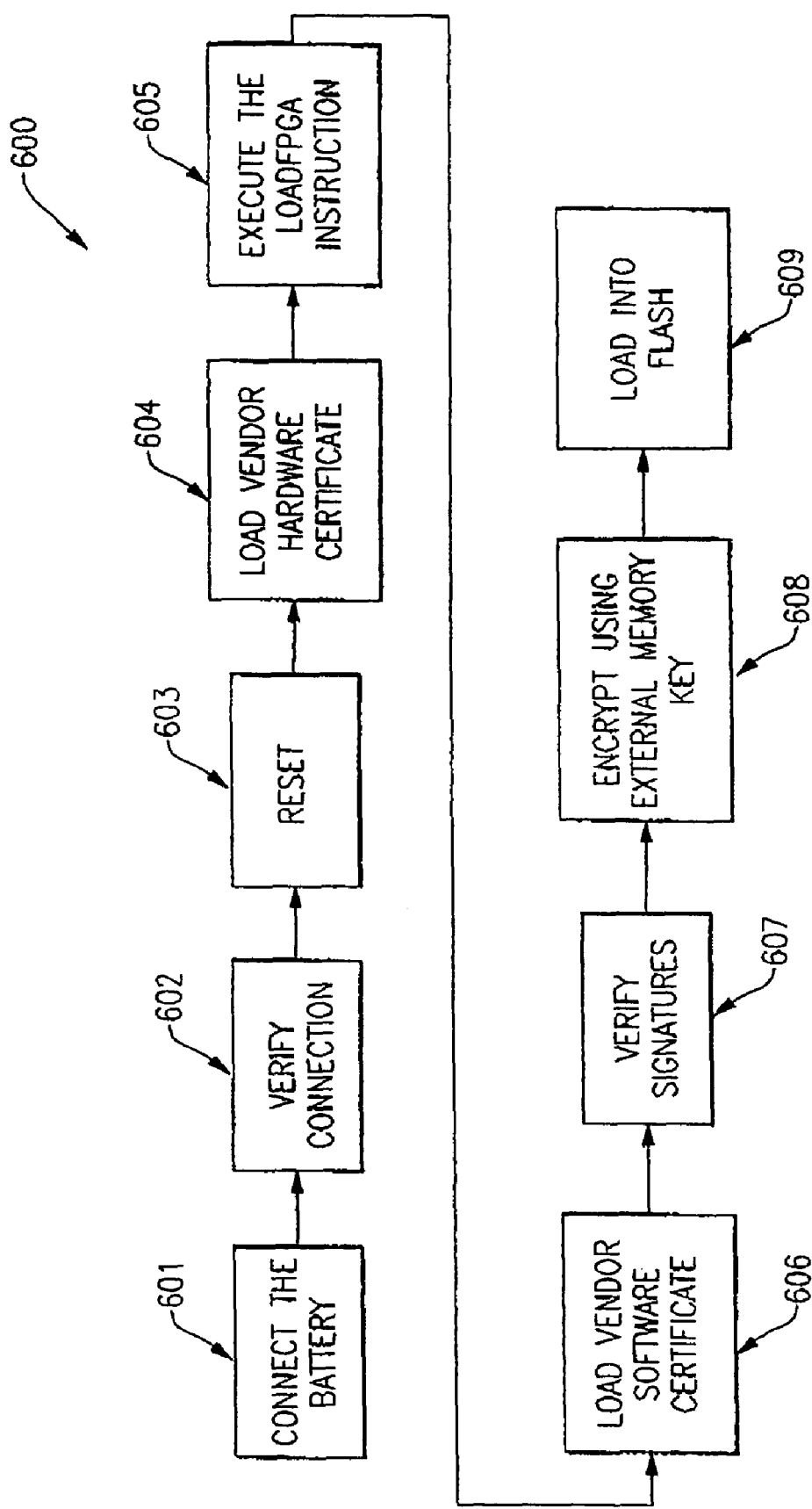
FIG. 8 is a process flow diagram illustrating the steps to be performed by a chip vendor to configure the FPGA portion of the chip.
Figure 9:
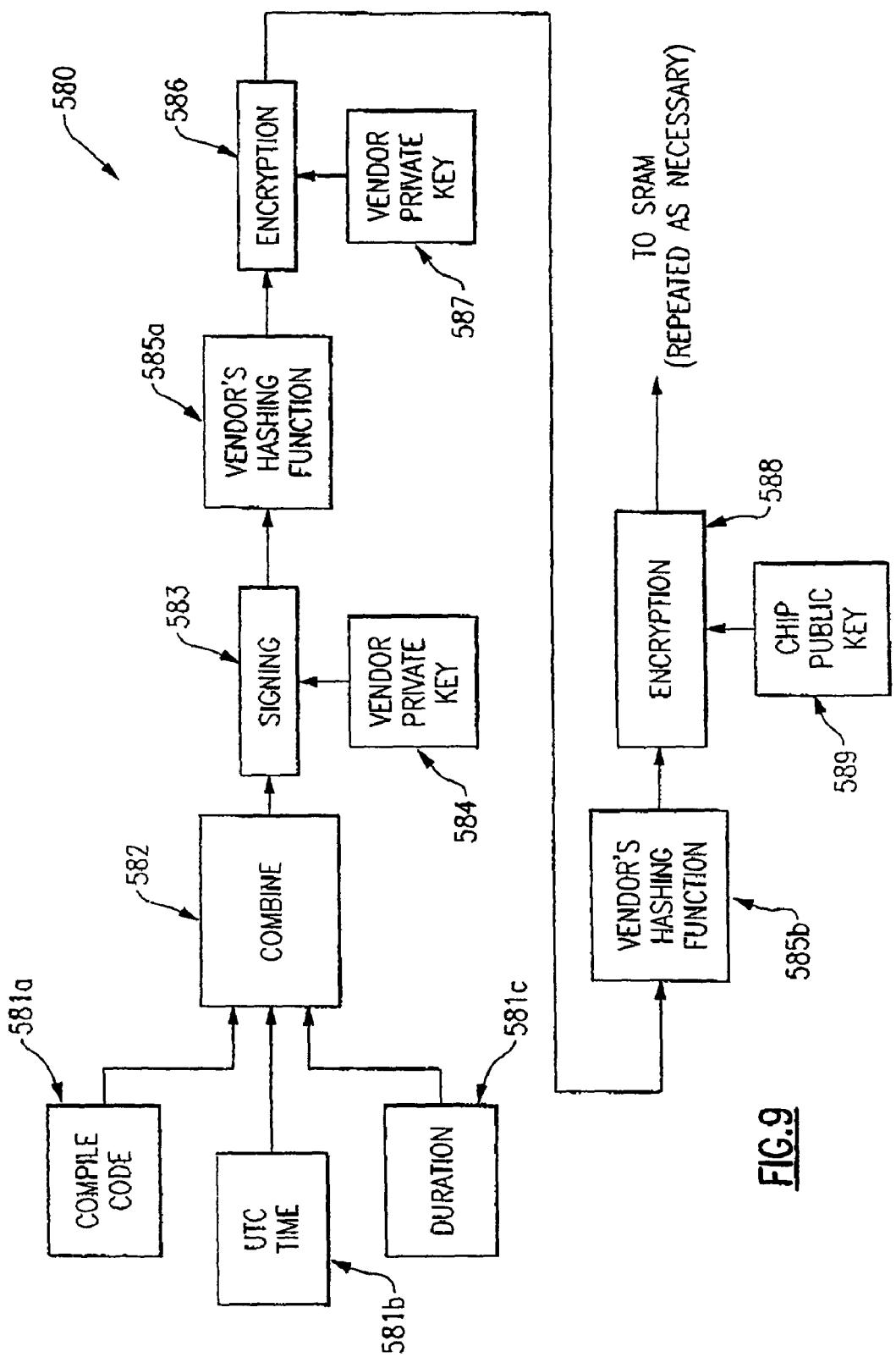
FIG. 9 is a process flow diagram illustrating the steps to be performed by a chip vendor to set up software which is to be used within typically nonvolatile portions of internal chip memory.
Figure 10:
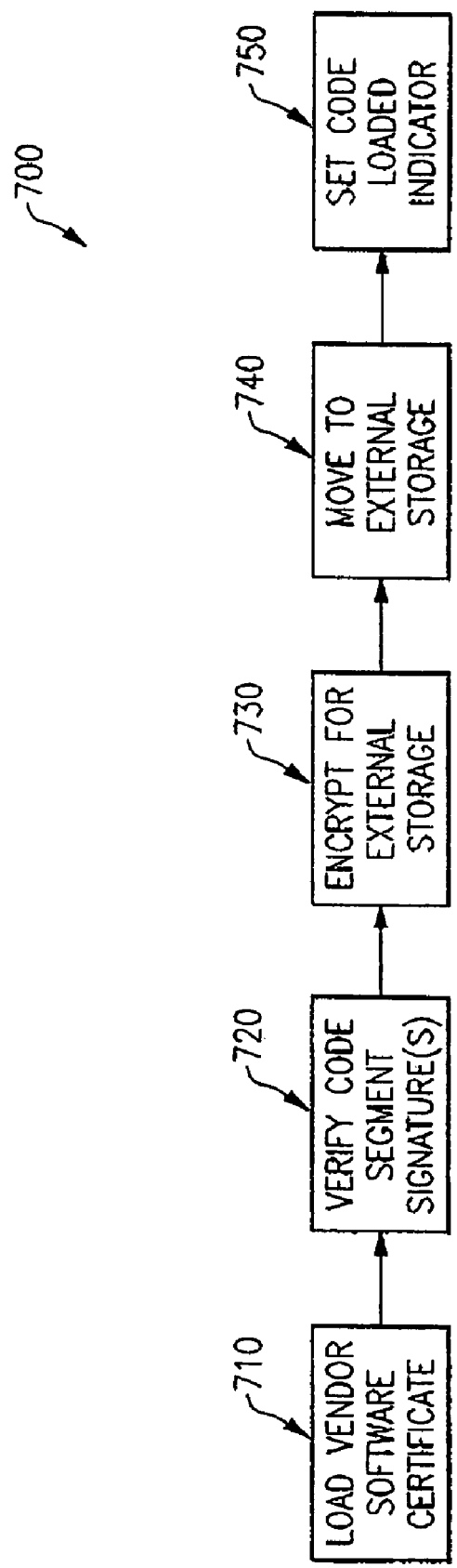
FIG. 10 is a process flow diagram illustrating the steps to be performed by a chip vendor to load the software prepared by the process shown in FIG. 9.

Once the certificates are loaded (see FIGS. 5 and 6), the information which is to be loaded is first prepared (see FIGS. 7 and 9). Finally, the desired FPGA data is loaded (FIG. 8) and then the software programming is loaded (FIG. 10). With the battery in place the chip is then ready to be shipped to the ultimate (end user) customer for use as a flexible, secure multi-engine cryptography processor, or as something else within the realm of processors. The details of these various steps are now described.

In this regard attention is again directed to FIG. 4. Once chip 100 is supplied to the chip vendor, the first step (reference numeral 520 in FIG. 4) is adding the vendor's hardware certificate (a set of bits used to verify the vendor's authority to make changes to FPGA 150B). If FPGA configuration data has been prepared and is available, it can be loaded now. Usually, however, the vendor also now loads into SRAM 132 (step 540) a vendor's software certificate (a set of bits used to verify the vendor's authority to make changes to internal, and therefore protected, memory units 130 and 132). Once these two certificates are loaded, and the information to be entered is prepared, the FPGA configuration data is loaded first (step 560) and then the software for use in eDRAM 130 and SRAM 132 is loaded next. In all of these processes it is, however, important to keep in mind that clear (that is, unencrypted) data never crosses the secure chip boundary. That is to say, the FPGA configuration data is specially encoded as also is any software to be loaded. The details of these processes are now described.

Figure 5:
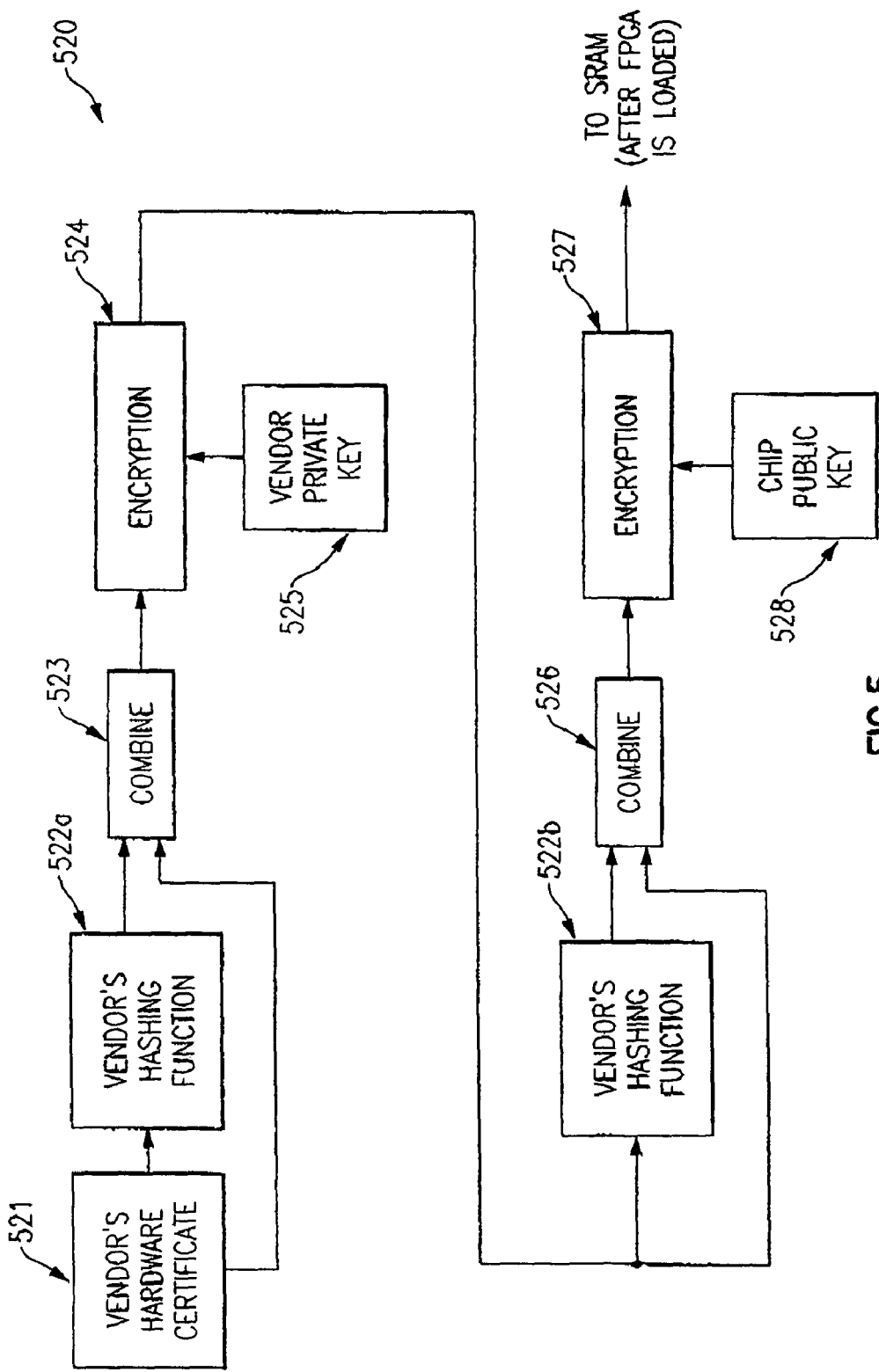
FIG. 5 is a process flow diagram illustrating a process for a vendor to use in order to provide a vendor's hardware certificate within an internal volatile chip memory to be used for verification and authentication purposes for establishing FPGA operations.

In particular, attention is directed to FIG. 5. The chip vendor employs a certificate process to ensure that only authorized changes are made to information present within secure chip boundary 101. This certificate is encrypted using the vendor's private key 525 in step 524. However, prior to this encryption step the vendor may employ an additional, optional duration activation step to support on-demand features that may be added to the system, where the feature activation codes are stored securely while activating a "nopath" mode by default. In the nopath mode, if the chip is on a system, by default there are no functions or paths that are activated for user use; rather functions are only activated for system usage or for feature code activation. This can apply to the resource asset management step by passing chosen certificate 521 through vendor's hashing function 522a. (See the discussion in the paragraph below for a general description of hashing functions.) The original vendor's hardware certificate 521 is then combined in step 523 with the hashed version of certificate 521. The combination that occurs in step 523 is preferably a concatenation of the two output bit sets (the original certificate plus its hashed version). The output from step 523 is then encrypted in step 524 using the vendor's private key 525. This encrypted output is then subjected to vendor's hashing function 522b and is combined with the unhashed version in step 526 which is also preferably a "combining by concatenation" operation. This hashing functions is, in general, the same hashing function employed in step 522a, except that it is applied to a different input bit stream. The output from step 526 is encrypted in step 527 using chip public key 528. The output from this step is supplied to SRAM 132. It is to be particularly noted though that the output from step 527 is preferably supplied to SRAM 132 through interface 110. However, before this is done it is understood that FPGA 160 (see FIG. 11) is programmed first through the invocation of the special purpose and limited "Load FPGA" command. Additionally, it is noted that, based on the enablement of external memory path 105 the FPGA may also be programmed to accept similar request blocks as through interface 110. The purpose of the process illustrated in FIG. 5 is the placement within SRAM 132 of encrypted indicia of authority for the purpose of subsequently permitting loading FPGA configuration data into FPGA 150B.

The inclusion of a nopath mode provides a significant advantage in terms of chip functioning. This special mode, as preferably implemented in the state machine logic of COACH flow control switch 150, provides a mechanism under which acceptable input to the chip includes only that information which enables the chip to be "turned on" or activated. Even more particularly, the use of this mode enables the chip to be enabled to perform certain functions and tasks to the exclusion of others. For example, the nopath mode permits the utilization of an authorization code that permits the chip to be operated for a limited period of time and/or for a specified duration. This mode also allows the chip to carry out certain operations and to forbid or deny access for others. For example, if the chip has been purchased for the purpose of cryptography using 1,024 bit keys, the chip can be precluded from carrying out cryptographic operations using 2,048 bit keys or 4,096 bit keys or any other key size. With the payment of additional fees, however, the chip may be made to be fully capable of performing these operations. Furthermore, while the chip of the present invention was initially viewed as a secure cryptographic processor, the same chip may also be viewed as a general purpose processor or set of processors whose functionality in terms of time and capability is controlled in an authorized and limited fashion in which the cryptographic engines present of the chip are used to provide the requisite levels of authorization. Thus, the chip of the present invention becomes an "on demand" device. Furthermore, control of the uses to which the chip device is put is still under the direct control of the chip manufacturer. Nonetheless, the chip manufacturer still has the capability of passing along this level of post-manufacture and post-sale control to another business entity, if desired. In a sense then, the chip becomes a "leased device" with a controllable lease duration and extent, control of which may also constitute a separate salable item.

In general, a hashing function describes a process in which a message or other information to be transmitted is mapped into a sequence of bits. The number of bits in the message is typically intended to be many orders of magnitude larger than the number of bits that are produced as output from the hashing function. The mapping is such that virtually any change in the bit content of the message is almost assuredly guaranteed to produce a change in the output of the hashing function. This provides assurance that, if there are any changes made to the message, this will show up in a mismatch between the original hashing function output and the new output from the hashing function. The hashing function output is commonly referred to as the message digest. Many different hashing functions are known to be able to achieve desirable levels of security. The present invention is, however, not limited to the use of one hashing function or another, just as long as they are used consistently. Some of the FIPS standards referred to above also include descriptions of acceptable hashing functions. For example, in FIPS Publication 180-2, dated Aug. 1, 2002, there is a description of what is referred to as the Secure Hash Standard (SHS) which specifies four Secure Hash Algorithms (SHA): SHA-1, SHA-256, SHA-384 and SHA-512.

A similar process 540 is also carried out for the purpose of placing within SRAM 132 an encrypted indicia of authority for the purpose of subsequently permitting loading software, such as an operation system and/or its components, into SRAM 132 and eDRAM 130. This process is illustrated in FIG. 6. It is noted, however, that this process, while similar to the process illustrated in FIG. 5, is particularly different in that it includes a mechanism for incorporating an encrypted time and date. This information may be used to provide time limits for the operation of the chip. As such the chip may be licensed for use for a given duration or for a set period of time between two dates or times. It is noted that this is an optional feature of the present invention. In operation a fully configured chip is supplied with a certificate of authority. This certificate may include time limitations or other indicia for controlling access to processing functionality provided on the chip, either in the form of processor 115 or in the form of cryptographic engine(s) 195. For purposes of the present invention, a certificate of authority is any digital indicia provided to the chip whose purpose is comparison with already encoded internal data with an appropriate match meaning that there is a grant of chip access to some level of chip functionality. This level of functionality access is directed both to temporal grants of permission and to grants of levels to performance and security, such as with the grant of permission to use a cryptographic key of a specified length. If necessary, a supplied certificate of authority is first decrypted using engine(s) 195 before it is compared with the data supplied to SRAM 132.

As one of the steps shown in FIG. 6, chip user certificate 542, which preferably incorporates a signed "duration" indication is combined with other information in step 546. The use of chip user certificate 542 provides a mechanism for controlling at least one optional aspect of the present invention, namely the ability to grant authorization for use for a defined time period or for a defined time duration. This certificate is thus usable to activate the system and/or to grant use of the system for performance of certain functions, such as cryptography, while simultaneously denying authority for other operations. In short, authorization may be selective in addition to being temporally controlled as well. User certificate 542 provides the proper indicia for this authority. While indicated as a duration, this indicia may also include beginning and end time and/or date indications. It is signed using the vendor's private key. The other information supplied to combining step 546 includes vendor's chosen software certificate 541. Certificate 541 is also processed through vendor's software hashing function in step 543*a*. This is preferably different than the vendor's hardware hashing function employed in the process illustrated in FIG. 5. The hashed vendor's software certificate is signed in step 544 using vendor's private key 545. The output from step 544 is combined with vendor's software certificate and also with chip user certificate 542. The combination is preferably by a simple concatenation. The output from combining step 546 is processed using vendor's software hashing function in step 543*b*, which may or may not provide the same hashing function as in step 543*a*. The output from step 543*b* is encrypted in step 547 using chip public key 548. As in the process shown in FIG. 5, the output is then supplied to SRAM 132.

A significant aspect associated with the high level of security provided by the chip of the present invention is that only encrypted data passes through interface 110. Accordingly, configuration data used to provide programming structure to FPGA 150B is encrypted before it is supplied to chip 100 through interface 110. The preferred process for carrying out this encryption is illustrated in FIG. 7. As with the vendor's software certificate, it is also possible to incorporate beginning and end time constraints and/or duration constraints into the operation of the chip and its components, such as FPGA 150B. As is well known, the structure of a programmed FPGA is provided in what is called a net list (also referred to as a "netlist"). Desired net list 561*a* is combined in step 562 with time indicator 561*b* (preferably provided in a coded form of universal coordinated time (UTC)) and with optional duration indication 561*c*. Again, the combining step is preferably a simple concatenation. The signed certificate (using the vendor's private key is passed through hashing function 565*a* and is encrypted in step 566 using vendor private key 567. The output from this step is passed through vendor's hashing function 565*b* and is then encrypted in step 568 using chip public key 569. As with the processes discussed above, the use of hashing functions is optional, but still very much desired to achieve the utmost in data security and integrity; moreover, each may or may not be different than the others. The output from encryption step 568 is supplied to chip 100 through interface 110 through the use of a special "LOAD FPGA" command whose operation is more particularly illustrated in FIG. 11 which is discussed herein in detail further below. Thus, it is seen that there is provided a process 560 for preparing FPGA configuration programming data prior to its transmission across secure chip boundary 101.

An overview of insertion process 600 for FPGA configuration data is shown in FIG. 8. It is first insured that the battery or other power supply is connected to chip 100 (step 601). Recall that in the absence of power, volatile SRAM memory 132 is erased. Next the power connection is verified in step 602. This is generally accomplished through the execution of an "on answer" command. As another example of how power connection is verified, this may be accomplished during the powering up process at which time voltage is applied to a phase locked loop (PLL) and to a reference clock which is generated from an oscillator. The locking of the PLL indicates a valid clock signal. At this point in time a hardware signature is generated by scanning data in and by verifying that the data scanned out matches the expected output for the data scanned in. The expected output is then typically compared against data stored in an internal EPROM. It is noted that this process is a standard operation commonly employed in microprocessors and similar circuit devices. A reset operation is then performed to insure that ASIC circuits 150A are in a proper initial state (step 603). In this regard, it is noted that a state machine design is typically employed in which there is provided a mechanism for the receipt of a special reset signal that takes the state machine into a well defined "init" state. Next the vendor hardware certificate is loaded into SRAM 132 (step 604; see FIG. 6). Next (step 605) the LOAD FPGA command is executed (see FIG. 11 and the discussions related thereto). Next (step 606) the vendor software certificate is loaded. The chip then internally verifies the signatures (after decryption using internally available keys; see FIG. 3). Next (step 608) the output from step 607 is encrypted using an external memory key and loaded into flash memory. In this regard, it is noted that when the chip is powered up for the very first time after manufacture, all of the data is encrypted under hard coded keys. These keys are used by the onboard cryptographic engines to encrypt and to decrypt data whenever necessary. The resulting data is encrypted under the ephemeral key stored in Battery Backed up SRAM 132 (BB-SRAM). The use of ephemeral keys in SRAM 132 not only enables the COACH system to have faster power up, but it also provides added security in case of physical attacks. On a second boot up operation, the FPGA data (that is, the netlist data that programs the FPGA) resides in an encrypted form in external memory 210. It is noted that this FPGA data is safely loaded into external memory using the battery backup. It is noted that this information is protected, not by keys initially stored in the on-chip fuses but rather on later, by independently provided key information. In operation, tampering with the present COACH device destroys any internally stored keys and thus makes the external memory useless. Thus, secret information is maintained as secret information, even if the card containing the COACH device is pulled from its system (or system level board). The presence of this encoded information provides two significant advantages: (1) it provides an additional indicator that the battery backup is functioning; and (2) it avoids the need to reinitialize the chip with FPGA data using the original manufacturer delivered data.

In addition to having a process for preparing FPGA configuration data to be loaded, there is also a corresponding process for preparing software to be loaded into chip memory in a secure fashion. As with the loading of FPGA configuration data, preparation involves encryption. The desired process is illustrated in FIG. 9 which is virtually identical to the process shown in FIG. 7 for the preparation of FPGA configuration data. The caption in FIG. 9 refers to "forming" since the term "compiling" has other meanings when applied to software. For example, the first step in FIG. 9 is a step of "compiling" the software, as that term is usually applied to a process in which code is converted into a so-called binary or executable format (step 581a). Apart from that initial distinction, the process of FIG. 9 proceeds in the same manner as the process of FIG. 7 described above. And, as with the process of FIG. 7, the inclusion of time and/or duration information is optional.

Attention is now directed to the next stage in the utilization of the COACH device in which the loading of hardware code (that is, FPGA programming) and software code is performed for the very first time. For subsequent situations, the initialization process is simpler as described below. However, the present discussion is nonetheless focused upon the very first time the manufactured chip is loaded with hardware (FPGA) data and software. The battery or batteries are first connected, if that is not already the case. Battery connection is verified by checking the voltage on the pin that connects to the external power supply. If the battery is not connected and/or if there is insufficient voltage present on the subject pin, then any keys stored in SRAM 132 are lost. In this case any data present in external memory 200 is also "lost" in the sense that it becomes locked under an unavailable key. Clearly, under these circumstances no hardware or software code is loaded and the chip is back at the stage where hardware specific FPGA code is to be provided. If such a failure is accompanied by evidence of physical tampering, then the chip is preferably discarded. To the extent that this process is automated, a low voltage or no voltage signal preferably results in providing a warning given to the user that no battery is hooked up and data will be lost on power down. This may be accomplished through a bit accessible to the system software layer. A bit stored in the voltage island is used to indicate tampering; this bit is not only useful for detecting a tampering event but is also useful for indicating that the batteries are not attached. This bit is contained within status register 134 shown in FIG. 2 within voltage island 145. When the chip is powered up, all of the components outside of the voltage island are reset. The information within the components on the voltage island is, however, maintained by battery unit 175 or by regular power supply 170. A signature within SRAM 132 indicates whether or not the chip is reset. This is an initialization signature which is loaded into SRAM 132 on first power up. If chip 100 is reset that means that voltage island 145 is initialized and if it is initialized, status register 134 is read using an internal address. In this regard it is noted that it is not necessary that the entirety of this register be present on voltage island 145; some bits in battery backed-up SRAM 132 that are part of the status register do not have to be on the voltage island. Status register 134 is present within voltage island 145 and also contains a bit indicative of tampering which is a value maintained at all times past the first initialization. When chip status is requested, a tamper bit is one of the bits provided; if it is set (based on the active value), it indicates a tampered or not-tampered status. Another bit is initialized to indicate whether or not the battery is connected.

If all goes well with the battery test, the chip is reset. In a chip reset operation, all of the components are preferably reset except for those on voltage island 145. The reset is carried out through the operation of the state machine upon which flow control circuit 150 is preferably based. After reset the hardware vendor certificate is loaded as the first step in the operation of the Load FPGA instruction. In a second step, in which FPGA data itself is loaded, the vendor hardware certificate is employed to make sure that the FPGA data matches the vendor's hardware certificate. However, the first time, the hard coded values in the eFuses are used to decrypt the data, and for each "powering up" after that the public key certified by the certificate is used to control access. Recall that, as shown in FIG. 5, this certificate is encoded using the vendor's private key which now insures a secure match. Once the Load FPGA instruction loads the vendor's hardware certificate into SRAM 132, the information in this certificate is used to decrypt the FPGA data which is then loaded into FPGA portion 150B of flow control switch 150. This insures that only an authorized vendor is permitted to modify the FPGA data. During the next stage of the Load FPGA instruction the vendor's software certificate, which has either been previously or is concurrently loaded via the Load FPGA instruction (see step 710 in FIG. 10), is used to decrypt and/or to verify (see step 720 in FIG. 10) software which is thereafter preferably stored in eDRAM 130 in an unencrypted form for use by processor 115. In the process contemplated for the vendor's software forming process FIG. 9 illustrates a more inclusive process in which the software is encrypted as well as being only hashed and signed. However, it is noted that the encryption related steps (586, 587, 588 and 589) are optional. Based on the desired level of security, there are thus two options. In the first option, the software is merely hashed and signed, thus keeping source code available thus resulting in a sped up of memory operations. Nonetheless, for added security, in a second option, the encryption related steps are employed as well as the other steps illustrated. This software typically includes some form of operating system or operating system kernel.

Figure 11:
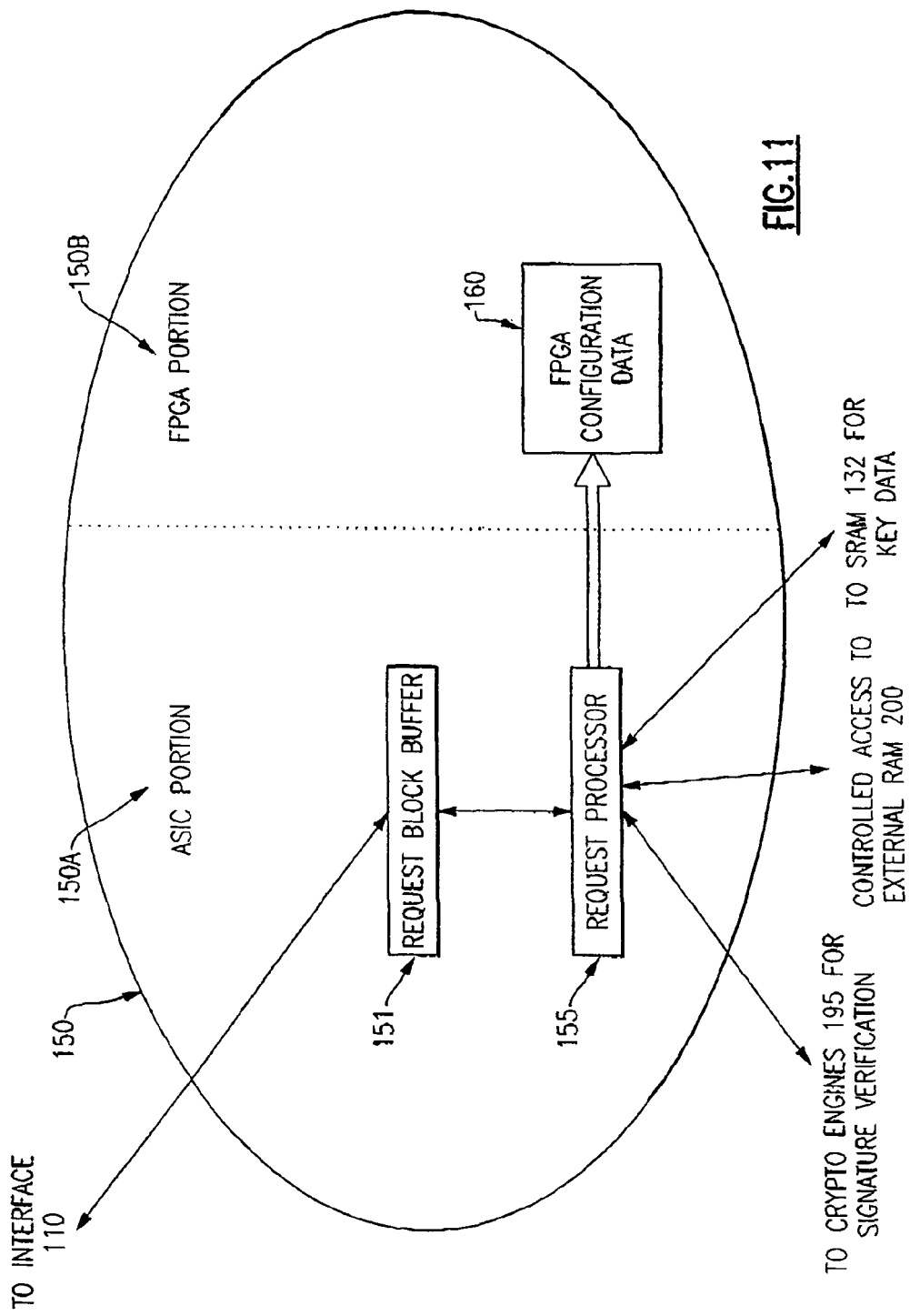
FIG. 11 is a block diagram illustrating one aspect of the combined ASIC and FPGA functional components used to provide flow control for data and commands received through a secure external interface.

The special purpose LOAD FPGA instruction is executed by supplying a specially recognized command, through interface 110; this command is recognized by request processor 155 in FIG. 11 which is implemented in ASIC hardware portion 150A of switch 150. As described above, this command includes key information which is selected to be compared with the previously stored hardware vendor certificate. If the comparison is successful, netlist data for programming FPGA portion 150B is permitted through interface 110 and is used to program FPGA portion 150B. At this point FPGA portion 150B of flow control switch 150 is now programmed. FPGA data is volatile and is protected via the use of the Load FPGA instruction, as described above, which requires proper cryptographic keys for access.

Once software in unencrypted form is present in eDRAM 130, it is preferable to also encrypt it (see step 730 in FIG. 10) and to load it (see step 740 in FIG. 10) into secure portion 210 (see FIG. 12) of external memory 200. This is done using the external_memory_key (See reference numeral 135D in FIG. 2). The external_memory_key is provided in the same fashion as fuses 135. One employs this information as a hard coded key, just like the other fuses. At the first time of use, any data that is shipped as part of the external memory is encrypted under the external_memory_key. The data is then decrypted and loaded internally, and encrypted again under a newly generated key and stored in external memory 200. Once code has been successfully stored in eDRAM 130, the state of a code_loaded register is set to indicate this status (see step 750 in FIG. 10). This register is preferably contained in a bit in status register 134 within voltage island 145 like the tamper bit discussed above. In variant embodiments status register 134 could be made part of SRAM 132.

The loaded software preferably includes a signature for each device driver loaded. While the software is stored in eDRAM 130 in unencrypted form, it is also desirable to store an encrypted copy of the contents of eDRAM 130 (or portions thereof) in external memory 200. Having this information stored there provides a convenient location for a "reboot" operation. One still loads the FPGA on every boot up, but at least you don't have to reuse the enablement diskette anymore; and it is more secure since, if tampering is detected, one uses the diskette to reinitialize the whole chip. The enabling diskette contains enabling software which pertains to the different protection layers generated earlier and which is encrypted under hard coded keys, that is, under keys implemented as fuses. This is like having a key to your own safe. Safe transfer from internal to external memory 200 is provided through external memory interface 105 which preferably works by securely controlling access to a limited set of addresses in memory 200.

As promised above, attention is now focused upon subsequent loadings of hardware (FPGA) and software information. In the process described above for the very first loading operations, it is generally assumed that the battery was not initially connected and/or that it was otherwise known that the very first load operation was to be performed. However, for subsequent load operations, it is first desirable to check the status of the code_loaded register. This is done by reading the battery_backed_up bit in status register 134 within voltage island 145. This bit is stored on voltage island 145 and is retrieved as described above with respect to addressing and accessing status register 134. If the register indicates that code is loaded and if there is no indication of error, then the operation proceeds by enabling the hardware by loading FPGA data from secure external memory portion 210. However, if tampering is detected or there is a hardware error or the battery or memory have failed, an error indication is provided in status register 134. This error indication is provided by means of status register bits which, by virtue of the register's presence on voltage island 145, are backed up battery 175, as needed. The contents of status register 134 is read by the chip internal software and is preferably reported to the operating system running in eDRAM 130 during its boot up operation and thereafter as well. Status register 134 is accessed by specifying its unique address or by executing a command or a read operation. Additionally, if the verification of the external encrypted memory doesn't vary the signature, the same mechanism is used to report the error. After FPGA data is loaded all of the segments of an operating system (or any other desired software) are retrieved from secure external memory portion 210, decrypted and stored in eDRAM 130. The chip is now ready to load the upper-level memory segments. The notion of a memory segment is described in the publicly available document titled "IBM 4758 Model 13 Security Policy" dated November 1999. For the present purposes, it is pointed out that segments 0 and 1 are memory portions into which booting code is inserted. This includes such things as miniboot, miniboot 0 and POST (Power-On Self-Test) code. Segment 2 is provided with Operating System (OS) level code. Finally, segment 3 contains application level programming.

Attention is now directed to the use and operation of real time clock 133 present on voltage island 145 (see FIG. 1). This is a hardware clock which is resetable in a secure fashion. It is usable in conjunction with time based authorizations for the use of all or portions of the chip's functionality. For example, this clock may be used to control either the duration of chip use or be used to lock in a particular start time or end time. As used herein, this clock refers to time that is quantized into any convenient period. It may be measured in days, weeks, months, years or nanoseconds and is limited only by the frequency of the clock/oscillator that is used in its hardware implementation. Once the chip is initialized there is a potential problem with feature activation for certain period of time. Validating the initial time set in real time clock 133 is an important step in minimizing this problem. In order to better facilitate the use of real time clock 133, it is desirable to also include a status bit in status register 134 which is set when clock 133 has been set in a secure manner. However, it is noted that, from within the chip itself, it is hard to determine whether or not clock 133 has been properly set.

To prevent use at unauthorized times or for unauthorized durations, a register within clock 133, which is used to store the current time and date, is controlled so that it may be changed only via a secure mechanism. There are several ways that this may be done. The easiest approach is to simply read the system clock of the system in which the chip is installed. The process of clock setting is preferably established using the host system for the COACH device and COACH chip device drivers. However, since the system clock is not a considered to be a sufficiently secure source of time information, this is not the desired approach for most applications, although for some limited purposes it may be acceptable, even if only temporarily so. In particular, a system clock may be set to a very early time setting so that the active period becomes longer and the chip manufacturer's rights are not protected. Accordingly, the preferred approach is to retrieve a signed time stamp from an agreed upon and/or certified server. At this point any applicable monetary charges may be assessed and processed. Once the hardware is installed, registration of the hardware is carried out; at this point in time, the actual current value indicated by real time clock 133 is set by means of encrypted message (which is an activation code). It is noted that in almost all situations minor delays in requesting time information and inserting it into real time clock 133 are well tolerated by the system.

Clearly, from FIG. 1 it is seen that flow control switch 150 plays a central role in the structure and operation of chip 100. The term "flow control switch," while being a convenient phrase to use for the discussion herein, is only partially descriptive of the functions that this block performs. While block 150 functions primarily as a hub for receiving data and commands and for routing relevant information to the other components on the chip, it includes a command processor mechanism for interpreting commands and for initiating steps to assure command completion together with notification of completion and/or completion status. In particular, switch 150 includes request processor 155 which interprets command portions of request block buffer 151. Buffer 151 should not be considered to be limited to the role of buffering only small numbers of characters or bits. It is preferably sized to hold relatively large portions of data destined for SRAM 132 or for eDRAM 130. Request processor 155 is coupled to one or more cryptographic engines 195 for those circumstances in which encryption and/or decryption is desired.

Figure 12:
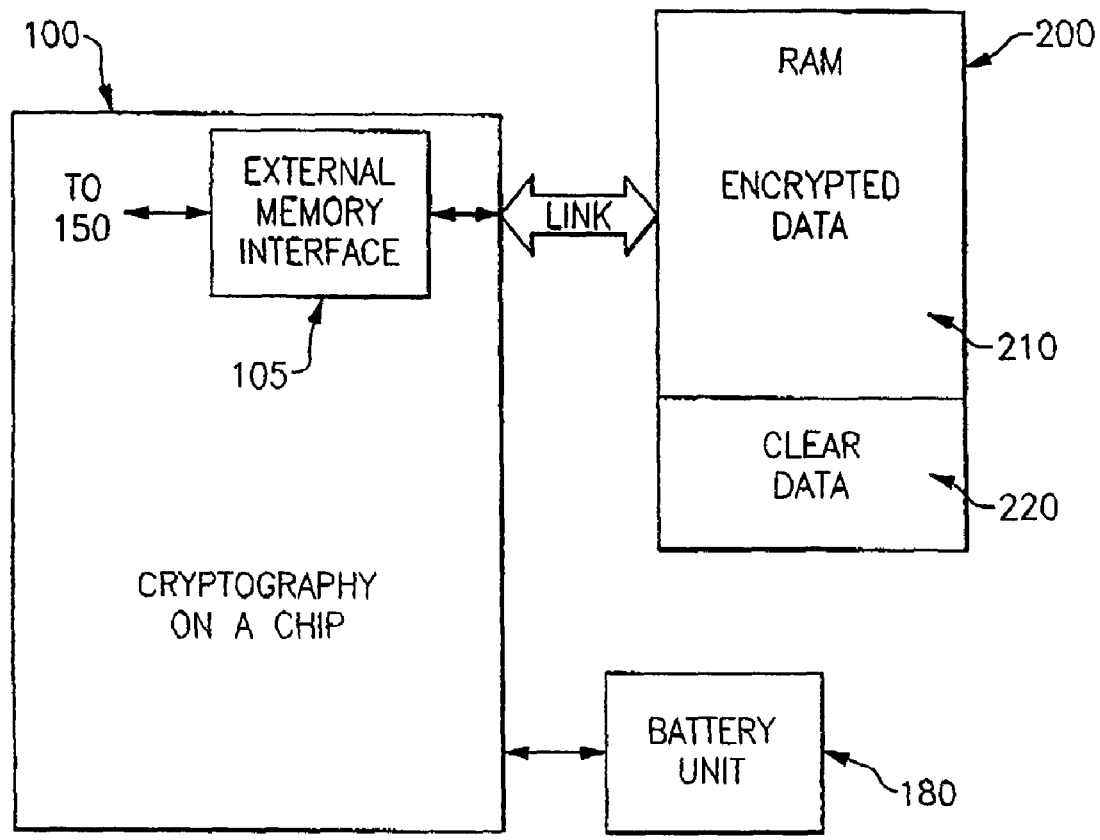
FIG. 12 is a block diagram illustrating the system of the present invention employed with a single external memory unit which, because of wholly contained security mechanisms can be safely divided up, from the same physical memory, into encrypted and unencrypted portions.

Processor 155 also provides secure access to external memory 200 (see FIG. 12). Note that here, the term "external memory" refers to memory that is not contained within secure chip boundary 101; it does not refer to eDRAM 130 or to SRAM 132 which are external in the relative sense to any memory that might be present as part of any embedded processor 115. Even more particularly, processor 155 acts to secure a portion of external memory 200 and to restrict its use to the storage of encrypted information (portion 210 in FIG. 12). This is preferably done through control of addresses. Processor 155 compares supplied addresses, for accessing external memory 200, with address ranges that have been previously set up as defining address boundaries. This is done through the establishment and use of an address mapping table that resides in SRAM 132 which contains keys and signatures to access different portions of the memory. It is transparent to the software. In particular, when an address is sent for a read or write operation, a key and a hash value is sent along with the address. Controls for confirming authority to access the address are implemented in flow control switch 150 and preferably within programmed FPGA hardware. Based on the address range being accessed, the key use is totally transparent to the operating system within eDRAM 130. These keys are only internal keys. They are erased upon tamper detection. The hash values are generated internally as well. This is one of the many flexible and adaptable properties of the present invention.

Processor 155 also has access to SRAM 132. It is in this volatile memory that cryptographic key information is stored. The key information stored in SRAM 132 is, however, not simply stored therein. The processes described above are employed. These processes make use of the chip private key, the chip public key and the vendor public key all of which are present within chip fuse area 135 (see FIG. 2). The use of a vendor private key makes secure insertion of information into SRAM 132 possible. The use of these keys also makes it possible to securely and more rapidly insert unencrypted data into SRAM 132. In general, SRAM technology provides faster access but it is not packageable as densely as eDRAM memory 130. Accordingly, one of the significant reasons for including eDRAM 130 is to contain chip size thus to reduce chip cost.

From the above it should be appreciated that the use of securely programmable FPGA components provides significant flexibility and, in particular, allows upgrades to the hardware by adding functionality and patches that are not currently in use. It also enables a method of providing fixes for hardware that is already in the field without adding the cost of redesigning and remanufacturing an entirely new chip. It also enhances the range of application software that can be run.

In normal operation a request block is sent to processor element 100 via interface 110. Request processor 155 returns a reply block via this same interface. The reply block typically contains an indication that an operation has completed successfully. However, the reply block can also contain an indication that the processor has failed in some way or that there has been a possible attempt at tampering.

Figure 13:
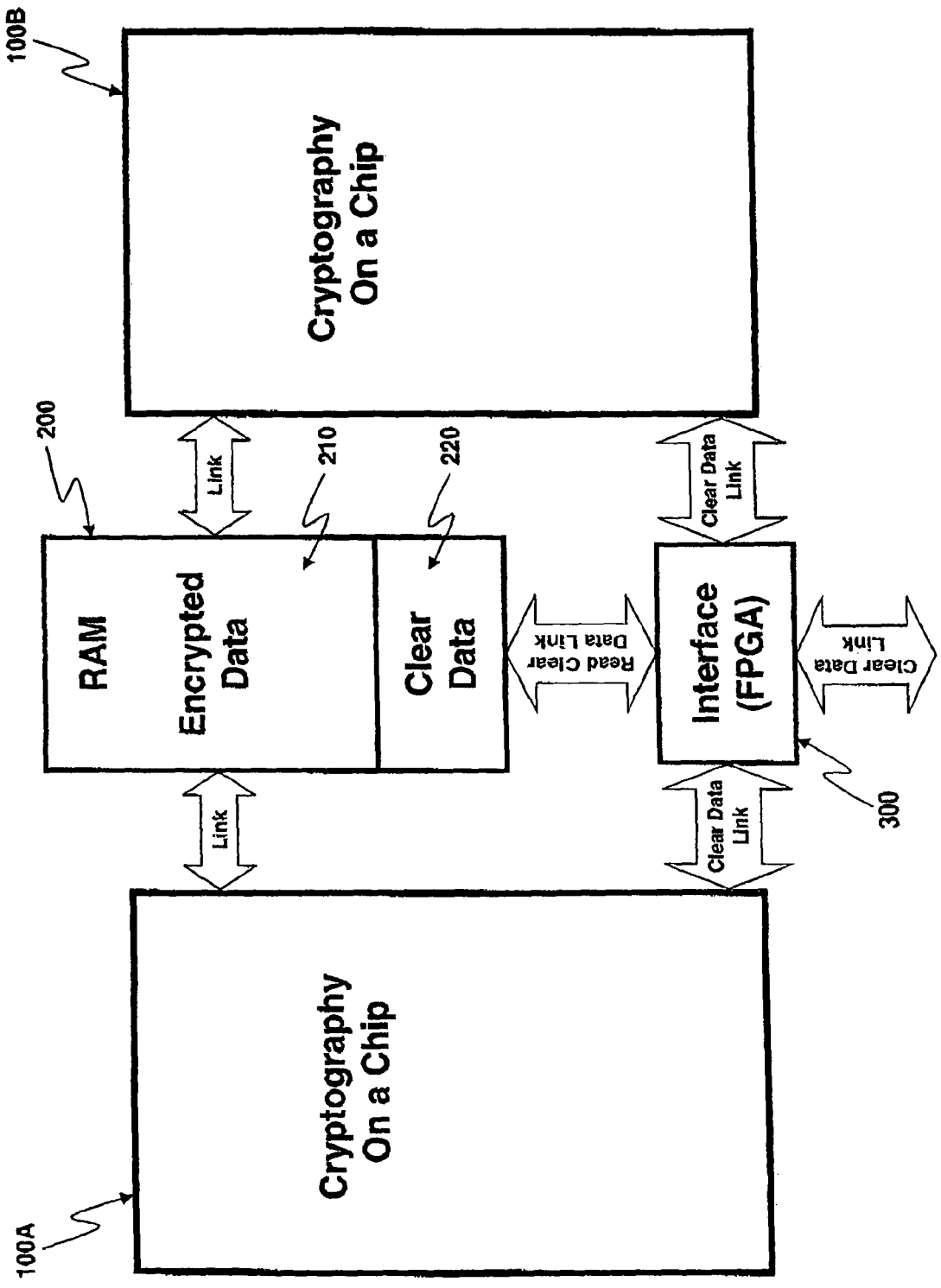
FIG. 13 is a block diagram illustrating the system of the present invention with a single shared external memory unit where some memory portion is only accessible by the COACH chip on the left, another portion accessible only by the COACH chip on the right, and another portion that is common for both Left and right COACH chips.
Figure 14:
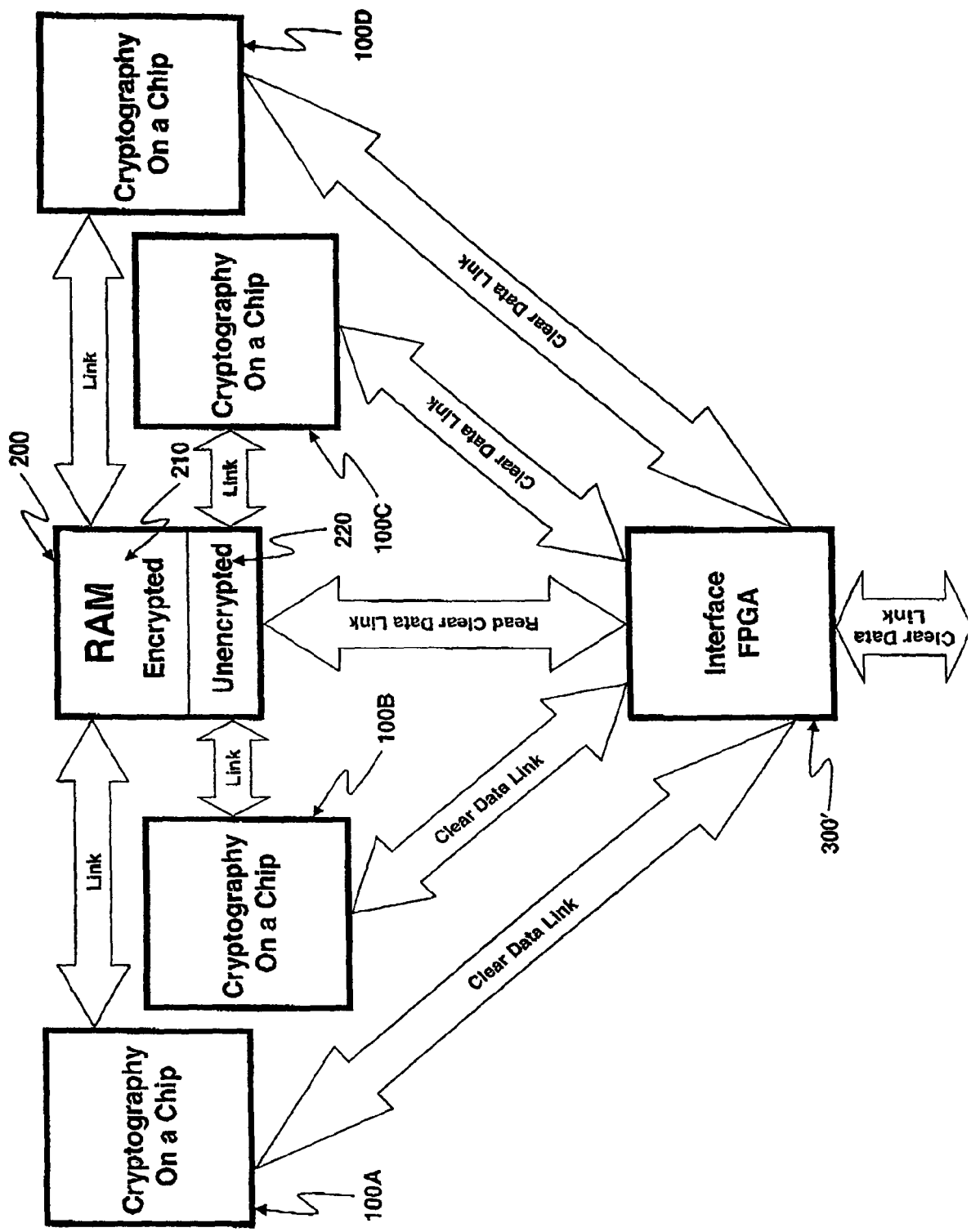
FIG. 14 is a block diagram illustrating the system of the present invention with a single shared external memory unit where each of the COACH chips have their own dedicated spaces respectively, and some memory portions are shared between two coach chips respectively and memory portions are shared amongst all the COACH chips residing on the same cards, and some memory portions are unencrypted.

At this point in the description, attention is now focused on the inventive aspects that are particularly illustrated in FIGS. 13 and 14. These figures are the ones that are directed to the inventive features specifically claimed herein, notably those aspects of the use of COACH chips which are directed to the use of two or more such chips in a cooperative relation. In order to achieve the advantages provided by the use of multiple COACH chips, a communication mechanism is established through the use of a shared external memory. This memory is preferably a RAM device, chip or system. However, any addressable memory may be employed in the most general embodiments of the present invention. It is noted that this achievement is accomplished in the face of the fact that the COACH chips themselves preferably have a highly secure boundary. In this aspect of the present invention, the COACH chips are provided with a mechanism for interacting that runs contrary to the their secure aspects; however, in the mechanism provided the secure features of the COACH chips is still preserved. It is noted though that, while security is a very significant feature of the COACH chips herein, there are circumstances in which security is sacrificable to other aspects such as performance and/or reliability. In short, secure features are not an essential component of every system employing COACH chips as such devices are referred to herein.

With respect to the COACH applications illustrated in FIGS. 13 and 14 for multi-chip situations, it is noted that each COACH chip is brought up independently. However, when each COACH chip is brought up for the first time an operational difference occurs which takes advantage of the fact that each COACH chip contains a certificate signed by the manufacturer. This certificate is defined and discussed above. Part of the configuration data is the configuration for each two COACH chips; one of them is selected to be the master. For a more complete description of what is meant by "configuration data" the reader is referred to the discussions above particularly those pertaining to the FPGA programming. Each COACH chip includes the certificate that is stored under battery power, where, if there is an attempt at tampering that memory (that is, the certificate) is erased. The stored certificate is used to authenticate the individual chip on the handshake operation of the COACH chips on system power-up. In addition to assisting in providing an authentication function, the public/secret key pair stored in memory under battery power is used to exchange information with another COACH chip (or chips in the case that more than two are present). This information includes, for example, the memory addresses that the other chip is allowed to access, the data to be shared, symmetric encryption and decryption keys that are be used to access the data at that memory location for verifying the result at the end of each operation by comparing against the result generated by the "partner" chip. The following information is shared between and or amongst every two COACH chips on a system of more than two COACH chips:

1. memory address of the different location(s);
2. the type of data each memory location contains (request block, operation result);
3. the length of each block;
4. an indicator of data block space (for encrypted and clear data);
5. an encryption key for each of the memory locations controlled by the sending COACH chip; and
6. a chaining vector for each memory location.

After the COACH chips are initialized, one of the memory locations that is shared is used to store the result of the different requests that the current COACH chip has just completed. The COACH chip that is considered the master, reads the memory location where the result of the lock-stepped other COACH chip has generated is stored. The receiving COACH chip then decrypts the data using the key that was shared during power-up. This key is shared and there is also provided an indication that the operation is complete before the shared memory is read, decrypted and the result compared. If the result decrypted matches the result generated, then the lock-stepping operation is considered to be successful. If the result doesn't match, the master chip requests another chip to do the same operation, if two out of three results match, the matching result is sent out. The mismatches are reported afterwards for error localization. The configuration of running chips in lockstep or individually, may be carried out in several modes. In a first mode, commands are configured and decoded so as to allow different COACH chips to work together so as to increase throughput. In another modality, the COACH chips are configured to either run independently or to run in lock-step mode. In this way the user is provided with an ability to trade off the increases in performance that occur when COACH chips are working on different aspect of the same problem versus increases in security by having multiple COACH chips work on the same problem and compare results for differences.

FIG. 13 illustrates the use of two COACH chips 100A and 100B. Each chip is connected through a link to external RAM 200. RAM 200 is partitionable into two portions: portion 210 for storing encrypted data and portion 220 for storing clear (unencrypted) data. The determination and control of the allocation of these two portions is under control of the master COACH chip. As indicated above there is one and only one master which is determined at time of power-up and external COACH chip recognition. The two chips are also provided with an unsecured communication link via interface 300 which is preferably implemented as a FPGA device. This communication path is used after power-up to provide mechanism for establishing secure communications through external memory 200. If the master chip is found to be in error the configuration can be swapped so that the remaining chip takes over the function of the master. In multiple chip configurations, such as shown in FIG. 14, the chips can operate in a two-out-of-three mode.

FIG. 14 is similar to FIG. 13 except that it is specifically directed to the use of four COACH chips, 100A, 100B, 100C and 100D, rather than just two such chips. One should not be deceived into believing that this is a mere doubling of the situation seen in FIG. 13. In particular, there are now a plurality of areas that are normally set up in external memory 200. Even more particularly, encrypted portion 210 now has subportions. For example, one such subportion may be devoted to communication (of commands and data) from COACH chip 100A to COACH chip 100C. Yet another portion would be devoted to providing a similar function for communication from COACH chip 100C to COACH chip 100A. Yet another subportion contains encrypted data that is shared between COACH chip 100A and COACH chip 100C. Likewise, other encrypted portions are directed to linking, in a secure fashion, other pairs of COACH chips. To establish the desired partitioning and control of external memory, unencrypted links are provided for each of the COACH chips through interface 300'. As above, this link is preferably provided by means of FPGA hardware. Clearly, the number of COACH chips used is expandable through the FPGA interface to the use of more than four COACH chips.

The invention above has been described in terms of using FPGA's as the device of choice in constructing COACH devices and related systems. However, it is noted that the present invention also contemplates the use of any other programmable circuit devices, such as PLD's (Programmable Logic Devices). Furthermore, while the description above refers to the use of PowerPC microprocessors for use as embedded processor 115, it is noted that any microprocessor may be employed for this purpose, including the line of Intel microprocessors.

In some of its aspects, the present invention refers to the use of cryptographic engines to provide cryptographic functionality. This functionality naturally includes the processes of encryption and decryption. However, it should also be appreciated that these engines are capable of carrying out other functions related to cryptography and to modular arithmetic operations such as modular addition and subtraction, modular multiplication, modular division, modular exponentiation and calculations relating to the use of the Chinese Remainder Theorem.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for controlling cryptography secured processing chips, said method comprising:
obtaining a first cryptography secured processing chip and a second cryptography secured processing chip interfaced together via an interface circuit, and each coupled to an external memory, wherein the first cryptography secured processing chip is a first system on a chip having a tamper proof secure chip boundary and the second cryptography secured processing chip is a second system on a chip having a tamper proof secure chip boundary, the first and second cryptography secured processing chips being separate chips, and wherein the interface circuit is an unsecured communication link between the first and second cryptography secured processing chips which is used after power up of the first and second cryptography secured chips in establishing secure communications between the first and second cryptography secured processing chips through the external memory;

independently powering up the first cryptography secured processing chip and the second cryptography secured processing chip;

upon power up, authenticating the first cryptography secured processing chip to the second cryptography secured processing chip and authenticating the second cryptography secured processing chip to the first cryptography secured processing chip, wherein the authenticatings employ a first public/secret key pair stored in memory under battery power in the first cryptography secured processing chip and a second public/secret key pair stored in memory under battery power in the second cryptography secured processing chip;

subsequent to the authenticatings, exchanging information between the first cryptography secured processing chip and the second cryptography secured processing chip, the exchanged information comprising for each cryptography secured processing chip:

memory addresses of memory locations in external memory controlled by the cryptography secured processing chip; and using the exchanged information in coordinating access to the external memory by the first cryptography secured processing chip and the second cryptography secured processing chip, wherein the external memory is external to the first and second cryptography secured processing chips and the coordinating access comprises establishing secure communications between the first cryptography secured processing chip and the second cryptography secured processing chip through the external memory.

2. The method of claim 1, further comprising defining regions of said external memory which are accessible to only the first cryptography secured processing chip, and to only the second cryptography secured processing chip, and an area of said external memory which is accessible to both the first cryptography secured processing chip and the second cryptography secured processing chip.

3. The method of claim 1, wherein the coordinating access comprises:

exchanging keys between the first cryptography secured processing chip and the second cryptography secured processing chip through public key encryption; and storing data encrypted under the exchanged keys in defined areas of said external memory.

4. The method of claim 3, wherein the exchanged information comprises for each cryptography secured processing chip:

a type of data each memory location contains for the cryptography secured processing chip; and an encryption key for each of the memory locations in external memory controlled by the cryptography secured processing chip.

5. The method of claim 1, wherein after power up of the first and second cryptography secured processing chips, the first and second cryptography secured processing chips exchange the information and a master cryptography secured processing chip is selected from among the first cryptography secured processing chip and the second cryptography secured processing chip, the master cryptography secured processing chip exchanging information with the other cryptography secured processing chip, the information including the memory addresses that the other cryptography secured processing chip is allowed to access, data to be shared between the first cryptography secured processing chip and the second cryptography secured processing chip, and symmetric encryption and decryption keys for each of the memory locations controlled by the master cryptography secured processing chip.

6. The method of claim 1, wherein the coordinating access further comprises indicating by a selected chip of the first cryptography secured processing chip and the second cryptography secured processing chip to the other chip what memory area of external memory data resides and what keys the data are encrypted under.

7. The method of claim 5, wherein a selected chip of the first cryptography secured processing chip and the second cryptography secured processing chip functions as a master chip facilitating the establishing secure communications and the coordinating access.

8. The method of claim 1, wherein the coordinating access comprises configuring the first cryptography secured processing chip and the second cryptography secured processing chip to operate in a selected operating mode of a plurality of possible operating modes employing the external memory.

9. The method of claim 8, wherein the one operating mode comprises processing by the first cryptography secured processing chip and the second cryptography secured processing chip separate portions of a command.

10. The method of claim 9, wherein the one operating mode comprises processing by the first cryptography secured processing chip and the second cryptography secured processing chip a same portion of a command, and comparing results of the processings.

11. The method of claim 1, wherein the first cryptography secured processing chip and the second cryptography secured processing chip each comprise a tamper proof chip boundary that meets at least one of the Federal Information Processing Standards (FIPs).

12. A system comprising:

a first cryptography secured processing chip and a second cryptography secured processing chip interfaced together via an interface circuit, and each coupled to an external memory, wherein the first cryptography secured processing chip is a first system on a chip having a tamper proof secure chip boundary and the second cryptography secured processing chip is a second system on a chip having a tamperproof secure chip boundary, the first and second cryptography secured processing chips being separate chips, and wherein the interface circuit is an unsecured communication link between the first and second cryptography secured processing chips which is used after power up of the first and second cryptography secured chips in establishing secure communications between the first and second cryptography secured processing chips through the external memory;

wherein the first cryptography secured processing chip and the second cryptography secured processing chip independently power up, and upon power up, the first cryptography secured processing chip authenticates to the second cryptography secured processing chip and the second cryptography secured processing chip authenticates to the first cryptography secured processing chip, wherein the authenticatings employ a first public/secret key pair stored in memory under battery power in the first cryptography secured processing chip and a second public/secret key pair stored in memory under battery power in the second cryptography secured processing chip;

wherein, subsequent to the authenticatings, the first cryptography secured processing chip and the second cryptography secured processing chip exchange information, the exchanged information comprising for each cryptography secured processing chip:

memory addresses of memory locations in external memory controlled by the cryptography secured processing chip;

wherein the external memory is external to the first and second cryptography secured processing chips; and wherein at least one of the first cryptography secured processing chip or the second cryptography secured processing chip coordinates access to the external memory by the first cryptography secured processing chip and the second cryptography secured processing chip, by automatically establishing secure communications between the first cryptography secured processing chip and the second cryptography secured processing chip through the external memory.

13. The system of claim 12, wherein the coordinating access further comprises defining regions of said external memory accessible to only the first cryptography secured processing chip and to only the second cryptography secured processing chip, and an area of said external memory which is accessible to both the first cryptography secured processing chip and the second cryptography secured processing chip.

14. The system of claim 12, wherein the coordinating access comprises:

exchanging keys between the first cryptography secured processing chip and the second cryptography secured processing chip through public key encryption; and storing data encrypted under the exchanged keys in defined areas of the external memory.

15. The system of claim 14, wherein the exchanged information comprises for each cryptography secured processing chip:

a type of data each memory location contains for the cryptography secured processing chip; and an encryption key for each of the memory locations in external memory controlled by the cryptography secured processing chip.

16. The system of claim 12, wherein after power up of the first and second cryptography secured processing chips, the first and second cryptography secured processing chips exchange the information and a master cryptography secured processing chip is selected from among the first cryptography secured processing chip and the second cryptography secured processing chip, the master cryptography secured processing chip exchanging information with the other cryptography secured processing chip, the information including the memory addresses that the other cryptography secured processing chip is allowed to access, data to be shared between the first cryptography secured processing chip and the second cryptography secured processing chip, and symmetric encryption and decryption keys for each of the memory locations controlled by the master cryptography secured processing chip.

17. The system of claim 12, wherein the first cryptography secured processing chip functions as a master chip facilitating the coordinating access.

18. The system of claim 12, wherein the coordinating access further comprises indicating by the first cryptography secured processing chip to the second cryptography secured processing chip what memory area of external memory data resides at and what keys the data are encrypted under.

19. The system of claim 12, wherein the first cryptography secured processing chip and the second cryptography secured processing chip each comprise a tamper proof chip boundary that meets at least one of the Federal Information Processing Standards (FIPs).

* * * * *